(12) United States Patent
Koreeda et al.

(10) Patent No.: US 8,072,694 B2
(45) Date of Patent: Dec. 6, 2011

(54) OBJECTIVE LENS

(75) Inventors: Daisuke Koreeda, Saitama-ken (JP); Koichi Maruyama, Tokyo (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 281 days.

(21) Appl. No.: 12/046,751

(22) Filed: Mar. 12, 2008

(65) Prior Publication Data
US 2008/0165436 A1 Jul. 10, 2008

Related U.S. Application Data

(62) Division of application No. 10/900,250, filed on Jul. 28, 2004, now Pat. No. 7,414,948.

(30) Foreign Application Priority Data

Jul. 29, 2003 (JP) ................................. 2003-281814
Sep. 30, 2003 (JP) ................................. 2003-340755

(51) Int. Cl.
*G02B 3/08* (2006.01)
(52) U.S. Cl. ....................................................... 359/742
(58) Field of Classification Search .................... 359/742
See application file for complete search history.

(56) References Cited

U.S. PATENT DOCUMENTS

| | | | |
|---|---|---|---|
| 6,594,222 B2 | 7/2003 | Maruyama | |
| 6,747,812 B2 | 6/2004 | Ota et al. | |
| 6,785,203 B2 * | 8/2004 | Maruyama et al. | 369/44.23 |
| 6,795,253 B2 * | 9/2004 | Shinohara | 359/716 |

FOREIGN PATENT DOCUMENTS

| | | |
|---|---|---|
| JP | 2001-243651 | 9/2001 |
| JP | 2003-156682 | 5/2003 |

* cited by examiner

*Primary Examiner* — Joseph P Matrtinez
(74) *Attorney, Agent, or Firm* — Greenblum & Bernstein, P.L.C.

(57) ABSTRACT

There is provided an objective lens used for a plurality of types of optical discs having a front surface and a rear surface, each of which includes an inner region and an outer region. The outer region has a surface shape which suppresses a coma caused when a beam used for a first optical disc is incident thereon obliquely with respect to an optical axis of the objective lens. The inner region is configured such that, at a boundary position between the inner region and the outer region, the coma caused when a beam used for a second optical disc is incident on the inner region obliquely at a first angle with respect to the optical axis is less than the coma caused when the beam used for the second optical disc is incident on the outer region obliquely at the first angle with respect to the optical axis. Further, an inclination $\theta_{2A}$ of the inner region and an inclination $\theta_{2B}$ of the outer region of the rear surface satisfy a condition: $-2.5 < \theta_{2B} - \theta_{2A} < 0.0 \ldots$ (1).

20 Claims, 18 Drawing Sheets

OBJECTIVE LENS

This application is a divisional of pending U.S. patent application Ser. No. 10/900,250, filed Jul. 28, 2004, the disclosure of which is expressly incorporated herein by reference in its entirety.

BACKGROUND OF THE INVENTION

The present invention relates to an objective lens used for an optical disc drive, which is capable of recording data to and/or reproducing data from a plurality of types of optical discs having different recording densities and having different thicknesses of cover layers.

There are various types of optical discs on which digital information is recorded at various densities, respectively. For example, a DVD (digital versatile disc) has a recording density higher that that of a CD (compact disc) or a CD-R (CD Recordable) and has a cover layer thinner than that of the CD or CD-R.

When recording/reproducing operation for the DVD having a higher recording density is performed, a smaller beam spot diameter is required on a data recording layer of the DVD relative to a beam spot used for the CD having a lower recording density. For this reason, the optical disc drive is configured such that an NA (numerical aperture) is changed to a higher value to obtain a smaller beam spot diameter when the DVD is used and that the NA is changed to a lower value to obtain a larger beam spot diameter when the CD or CD-R is used.

A condition of a spherical aberration in an optical system of the optical disc drive changes depending on a thickness of the cover layer of the optical disc being used. Therefore, it is required to correct the spherical aberration caused when the optical disc is changed to another one having different thickness of the cover layer.

The diameter of the beam spot decreases as a wavelength of a laser beam incident on the objective lens decreases. Therefore, in general, a laser beam having a wavelength ranging from 635 nm to 660 nm is used for the DVD, and a laser beam having a wavelength ranging from 780 nm to 830 nm is used for the CD. By using such wavelengths, a relatively small beam spot is obtained when the DVD is used, and a relatively large beam spot is obtained when the CD is used.

In general, the optical disc drive is provided with a light source configured to emit laser beams having different wavelengths in order to support different types of optical discs.

Japanese Patent Provisional Publication No. 2001-243651 discloses an objective lens configured to suitably converge incident laser beams onto data recording layers of a plurality of types of optical discs having different thicknesses of cover layers, respectively. On one of lens surfaces of the objective lens disclosed in this publication, a diffracting structure having a plurality of ring-shaped minute steps is formed. In an optical system disclosed in the publication, each of two collimated laser beams having different wavelengths is incident on the objective lens.

In order to form beam spots more suitable for recording data to and/or reproducing data from the plurality of types of the optical discs, the objective lens is required to be corrected for a coma as well as the spherical aberration. The coma is caused when off-axis light is incident on the objective lens (i.e., when a beam is incident on the objective lens obliquely with respect to an optical axis of the objective lens).

However, the objective lens disclosed in the publication 2001-243651 can not suitably correct the comas for all of the plurality of types of optical discs. More specifically, the objective lens disclosed in the publication is configured to adjust balance of the coma considering the intended use of an optical disc drive including the objective lens.

Japanese Patent Provisional Publication No. 2003-156682 discloses an objective lens configured to support the plurality of types of the optical discs and to reduce the coma caused when off-axis light is incident thereon. Each of lens surfaces of this objective lens has an inner region and an outer region located outside the inner region.

The inner region is a region for attaining an NA for a second optical disc having a lower recording density. The outer region is a region for attaining an NA for a first optical disc having a recording density higher than that of the second optical disc. The inner region and the outer region of each of the lens surfaces of the objective lens have different shapes.

In the publication, it is described that the coma caused when the off-axis light is incident on the objective lens is reduced by the above mentioned structure. However, in the publication No. 2003-156682, no explanation is made on how to configure the shapes of the inner region and the outer region of each lens surface to effectively reduce the coma.

SUMMARY OF THE INVENTION

The present invention is advantageous in that it provides an objective lens which is capable of suppressing a coma caused when a beam is incident on the objective lens obliquely with respect to an optical axis of the objective lens so that the objective lens can form beam spots suitable for recording data to and/or reproducing data from a plurality of types of optical discs.

According to an aspect of the invention, there is provided an objective lens used for recording data to and/or reproducing data from a plurality of types of optical discs having different thicknesses of cover layers. The plurality of types of optical discs includes a first optical disc and a second optical disc having a cover layer thicker than that of the first optical disc. The objective lens includes a front surface located on a light source side, and a rear surface located on an optical disc side. Each of the front and rear surface includes an inner region for attaining a numerical aperture required to record data to and/or to reproduce data from the second optical disc, and an outer region for attaining a numerical aperture required to record data to and/or to reproduce data from the first optical disc, the outer region being located outside the inner region.

In this structure, the outer region of each of the front and rear surfaces has a surface shape which suppresses a coma caused when a beam used for the first optical disc is incident thereon obliquely with respect to an optical axis of the objective lens. The inner region of each of the front and rear surfaces is configured such that, at a boundary position between the inner region and the outer region, the coma caused when a beam used for the second optical disc is incident on the inner region obliquely at a first angle with respect to the optical axis is less than the coma caused when the beam used for the second optical disc is incident on the outer region obliquely at the first angle with respect to the optical axis.

Further, the rear surface is configured to satisfy a condition:

$$-2.5 < \theta_{2B} - \theta_{2A} < 0.0 \tag{1}$$

where $\theta_{2A}$ (degree) represents an inclination of the inner region of the rear surface at the boundary position of the rear surface, $\theta_{2B}$ (degree) represents an inclination of the outer region of the rear surface at the boundary position of the rear surface, the inclination $\theta_{2A}$ is an angle formed by a line normal to the inner region with respect to the optical axis, the inclination $\theta_{2B}$ an angle formed by a line normal to the outer region with respect to the optical axis, and the inclinations $\theta_{2A}$ and $\theta_{2B}$ are plus when the inclinations $\theta_{2A}$ and $\theta_{2B}$ are measured in a clockwise direction with respect to the optical axis.

With this configuration, the coma can be sufficiently corrected for each of the plurality of types of optical discs. Consequently, beam spots suitable for recording data to and/or reproducing data from the plurality of types of optical discs are formed on data recording layers of the plurality of types of optical discs, respectively.

Optionally, the front surface may be configured to satisfy a condition:

$$-1.2 < \theta_{1B} - \theta_{1A} < 0.0 \quad (2)$$

where $\theta_{1A}$ (degree) represents an inclination of the inner region of the front surface at the boundary position of the front surface, $\theta_{1B}$ (degree) represents an inclination of the outer region of the front surface at the boundary position of the front surface, the inclination $\theta_{1A}$ is an angle formed by a line normal to the inner region with respect to the optical axis, the inclination $\theta_{1B}$ is an angle formed by a line normal to the outer region with respect to the optical axis, and the inclinations $\theta_{1A}$ and $\theta_{1B}$ are plus when the inclinations $\theta_{1A}$ and $\theta_{1B}$ are measured in a clockwise direction with respect to the optical axis.

Still optionally, at least one of the front and rear surfaces may have a diffracting structure.

Still optionally, the objective lens may be used so that magnifications for the first and second optical discs are substantially the same.

Still optionally, the outer region of the rear surface may be defined as a region through which a beam passed through the outer region of the front surface passes.

Still optionally, the inner regions of the front and rear surfaces may be configured such that the coma is sufficiently reduced for an optical disc whose cover layer has an intermediate thickness between the first optical disc and the second optical disc.

Still optionally, the rear surface may be configured to satisfy a condition: $-2.50 < \theta_{2B} - \theta_{2A} < -0.05$ ... (4). In this case, the rear surface may be configured to satisfy a condition:

$$-1.0 \times 10^{-3} < X_B - X_A < 1.0 \times 10^{-3} \quad (3)$$

where $X_A$ represents a distance, measured at the boundary position, between a surface defined by a surface shape of the inner region and a plane tangential to the rear surface at the optical axis, and $X_B$ represents a distance, measured at the boundary position, between a surface defined by a surface shape of the outer region and a plane tangential to the rear surface at the optical axis.

According to another aspect of the invention, there is provided an objective lens used for recording data to and/or reproducing data from a plurality of types of optical discs having different thicknesses of cover layers. The plurality of types of optical discs includes a first optical disc and a second optical disc having a cover layer thicker than that of the first optical disc. The objective lens includes a front surface located on a light source side, and a rear surface located on an optical disc side. Each of the front and rear surface includes an inner region for attaining a numerical aperture required to record data to and/or to reproduce data from the second optical disc, and an outer region for attaining a numerical aperture required to record data to and/or to reproduce data from the first optical disc, the outer region being located outside the inner region.

In this structure, the outer region of each of the front and rear surfaces has a surface shape which suppresses a coma caused when a beam used for the first optical disc is incident thereon obliquely with respect to an optical axis of the objective lens. The inner region of each of the front and rear surfaces is configured such that, at a boundary position between the inner region and the outer region, the coma caused when a beam used for the second optical disc is incident on the inner region obliquely at a first angle with respect to the optical axis is less than the coma caused when the beam used for the second optical disc is incident on the outer region obliquely at the first angle with respect to the optical axis. Further, the inner region and the outer region of the rear surface are continuously connected to each other at the boundary position of the rear surface.

With this configuration, the coma can be sufficiently corrected for each of the plurality of types of optical discs. It is preferable that the boundary position between the inner region and the outer region is smoothed, for example, in a grinding process so that ill effects caused by a step formed at the boundary position can be avoided. For this reason, the boundary position is smoothed.

FIG. 20 schematically shows a cross section of the rear surface of the objective lens. According to the above mentioned configuration of the objective lens, the inner region $LA_2$ and the outer region $LB_2$ of the rear surface are continuously connected to each other as indicated by a curve $LA_2$–$LC_2$–$LB_2$.

Optionally, a size of an area for continuously connecting the inner region to the outer region may be less than or equal to 2% of a sum of areas of the inner and outer regions of the rear surface.

The smoothed portion $LC_2$ may cause reduction in light quantity because light passed through the smoother portion $LC_2$ does not suitably converge on to the optical disc. To avoid such a phenomenon, according to the above configuration, the size of the area (smoothed portion) is configured to be less than or equal to 2% of the sum of areas of the inner and outer regions of the rear surface.

According to another aspect of the invention, there is provided an objective lens used for recording data to and/or reproducing data from a plurality of types of optical discs having different thicknesses of cover layers. The plurality of types of optical discs includes a first optical disc and a second optical disc having a cover layer thicker than that of the first optical disc. The objective lens includes a front surface located on a light source side, and a rear surface located on an optical disc side. Each of the front and rear surface includes an inner region for attaining a numerical aperture required to record data to and/or to reproduce data from the second optical disc, and an outer region for attaining a numerical aperture required to record data to and/or to reproduce data from the first optical disc, the outer region being located outside the inner region.

In this structure, the outer region of each of the front and rear surfaces has a surface shape which suppresses a coma caused when a beam used for the first optical disc is incident thereon obliquely with respect to an optical axis of the objective lens. The inner region of each of the front and rear surfaces is configured such that, at a boundary position between the inner region and the outer region, the coma caused when a beam used for the second optical disc is incident on the inner region obliquely at a first angle with respect to the optical axis is less than the coma caused when the beam used for the second optical disc is incident on the outer region obliquely at the first angle with respect to the optical axis.

Further, the objective lens is formed by injection molding using a mold configured such that a portion corresponding to the boundary position of at least one of the front and rear surfaces is processed to be a continuous surface by using an R-bite.

With this configuration, the coma can be sufficiently corrected for each of the plurality of types of optical discs. Such process for making the boundary position the continuous surface may be performed if design shapes of the inner region and the outer region of at least one of the front and rear surfaces are discontinuously connected to each other at the boundary position or are not completely continuously connected to each other at the boundary position.

According to another aspect of the invention, there is provided an objective lens including a front surface and a rear surface. At least one surface of the front and rear surfaces includes a plurality of regions having different shapes. The at least one surface is configured such that, at each of boundary positions between adjacent ones of the plurality of regions, the adjacent ones of the plurality of regions are continuously connected to each other.

With this configuration, it becomes possible to sufficiently suppress the coma for each of the plurality of types of optical discs.

In a particular case, the plurality of regions may include an inner region and an outer region outside the inner region. A size of an area for continuously connecting the inner region to the outer region is less than or equal to 2% of a sum of areas of the inner and outer regions of the rear surface.

According to another aspect of the invention, there is provided an optical system which includes an objective lens having a front surface and a rear surface. At least one surface of the front and rear surfaces includes a plurality of regions having different shapes. The at least one surface is configured such that, at each of boundary positions between adjacent ones of the plurality of regions, the adjacent ones of the plurality of regions are continuously connected to each other.

With this configuration, it becomes possible to sufficiently suppress the coma for each of the plurality of types of optical discs.

In a particular case, the plurality of regions of the objective lens may include an inner region and an outer region outside the inner region. A size of an area for continuously connecting the inner region to the outer region is less than or equal to 2% of a sum of areas of the inner and outer regions of the rear surface.

According to another aspect of the invention, there is provided an objective lens including a front surface and a rear surface. At least one surface of the front and rear surfaces includes a plurality of regions having different shapes. The objective lens is formed by injection molding using a mold configured such that portions corresponding to boundary positions of adjacent ones of the plurality of regions are processed to be continuous surfaces by using an R-bite.

With this configuration, it becomes possible to sufficiently suppress the coma for each of the plurality of types of optical discs. Such process for making the boundary position the continuous surface may be performed if design shapes of the plurality of regions of the at least one surface are discontinuously connected to each other at the boundary positions, respectively, or are not completely continuously connected to each other at the boundary positions, respectively.

According to another aspect of the invention, there is provided an optical system which includes an objective lens having a front surface and a rear surface. At least one surface of the front and rear surfaces includes a plurality of regions having different shapes. The objective lens is formed by injection molding using a mold configured such that portions corresponding to boundary positions of adjacent ones of the plurality of regions are processed to be continuous surfaces, respectively, by using an R-bite.

With this configuration, it becomes possible to sufficiently suppress the coma for each of the plurality of types of optical discs. Such process for making the boundary position the continuous surface may be performed if design shapes of the plurality of regions of the at least one surface are discontinuously connected to each other at the boundary positions, respectively, or are not completely continuously connected to each other at the boundary positions, respectively.

BRIEF DESCRIPTION OF THE ACCOMPANYING DRAWINGS

DETAILED DESCRIPTION OF THE EMBODIMENTS

Hereinafter, embodiments according to the invention are described with reference to the accompanying drawings.

First Embodiment

Figure 1A:
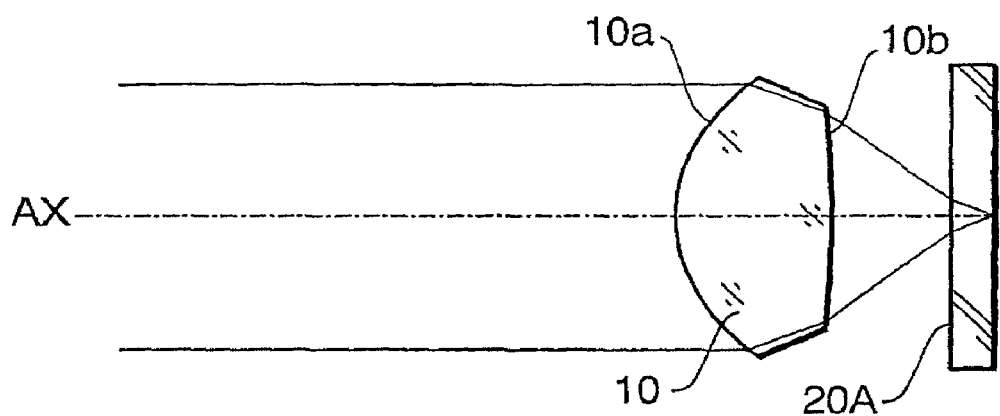
FIG. 1A shows a configuration of an optical system including an objective lens according to a first embodiment of the invention when a first optical disc having higher recording density is used.
Figure 1B:
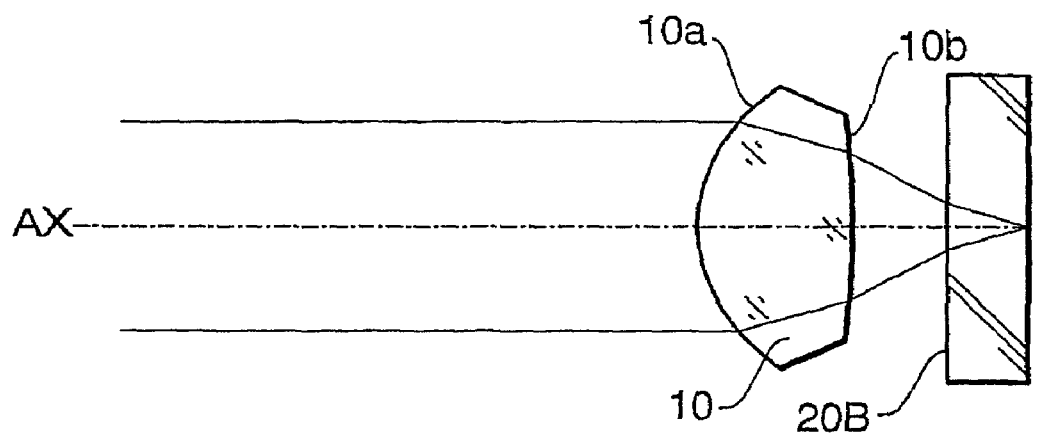
FIG. 1B shows of a configuration of the optical system including the objective lens according to the first embodiment of the invention when a second optical disc having lower recording density is used.

FIGS. 1A and 1B show an objective lens 10 according to a first embodiment of the invention. The objective lens 10 is used for recording data to and/or reproducing data from a plurality of types of optical discs. The objective lens 10 is employed in an optical disc drive (not shown) which supports the plurality of types of the optical discs. FIG. 1A shows an optical path in an optical system of the optical disc drive when an optical disc 20A having a higher recording density is used. FIG. 1B shows an optical path in the optical system of the optical disc drive when an optical disc 20B having a recording density lower than that of the optical disc 20A is used.

The optical disc 20A is, for example, a DVD (digital versatile disc) having a cover layer whose thickness is thinner than that of a CD (compact disc). The optical disc 20B is, for example, the CD having a relatively thick cover layer. The optical disc 20A or 20B is placed on a turn table (not shown) in the optical disc drive when the recording and/or reproducing operation is performed.

When recording and/or reproducing operation for the optical disc 20A is performed a laser beam having a wavelength of 657 nm (hereafter, referred to as a first laser beam) is emitted from a light source (not shown) so as to form a relatively small beam spot on a data recording layer of the optical disc 20A. When recording and/or reproducing operation for the optical disc 20B is performed a laser beam (hereafter, referred to as a second laser beam) having a wavelength longer than that of the first laser beam is emitted from the light source so as to form a relatively large beam spot on a data recording layer of the optical disc 20B.

As shown in FIGS. 1A and 1B, the optical system is configured such that a collimated beam (first or second laser beam) is incident on the objective lens 10 for each of the optical disc 20A and 20B. The optical system has collimator lenses which convert the first and second laser beams emitted by the light source to the collimated beams, respectively. The collimated first laser beam is converged by the objective lens 10 onto the data recording layer of the optical disc 20A. The collimated second laser beam is converged by the objective lens 10 onto the data recording layer of the optical disc 20B.

Since the collimated beam is incident on the objective lens 10, aberrations are not caused when the objective lens 10 is shifted vertically in FIG. 1A or 1B from a reference axis of the optical system by tracking operation.

The objective lens 10 is a biconvex plastic single lens having a first surface 10a (front surface) located on a light source side and a second surface 10b (rear surface) located on an optical disc side. Both of the first and second surfaces 10a and 10b are aspherical surfaces. Since as described above the thicknesses of the cover layers of the optical discs 20A and 20B are different from each other, a coma and a spherical aberration change depending on the type of the optical disc being used. To sufficiently suppress such aberrations, the objective lens 10 is configured as follows.

Figure 2C:
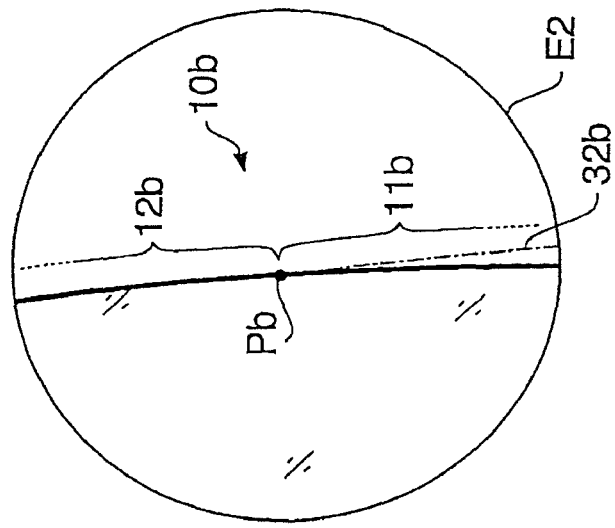
FIG. 2C is a cross section of a second surface of the objective lens.
Figure 2A:
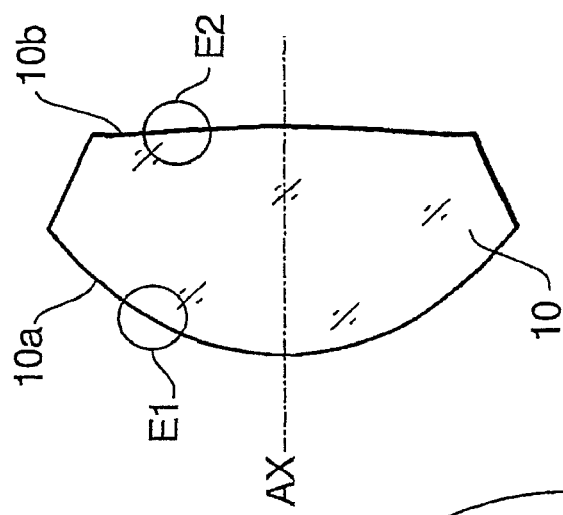
FIG. 2A is an enlarged view of the objective lens.
Figure 2B:
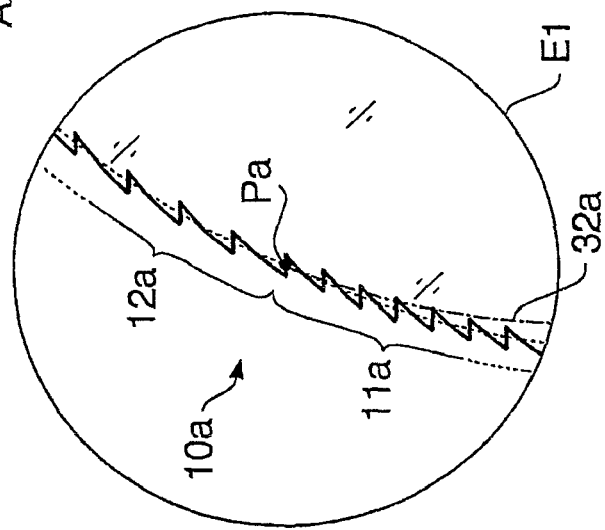
FIG. 2B is a cross section of a first surface of the objective lens.

FIG. 2A is an enlarged view of the objective lens 10. FIG. 2B is a cross section of the first surface 10a of the objective lens 10 illustrating a section E1 of FIG. 2A. FIG. 2C is a cross section of the second surface 10b of the objective lens 10 illustrating a section E2 of FIG. 2B.

As shown in FIG. 2B, the first surface 10a has an inner region 11a including an optical axis AX of the objective lens 10 and an outer region 12a surrounding the inner region 11a. The outer region 12a extends from a boundary between the inner region 11a and the outer region 12a to the outermost portion of the objective lens 10. The inner region 11a and the outer region 12a have different shapes.

Also, as shown in FIG. 2C, the second surface 10b has an inner region 11b including the optical axis AX and an outer region 12b surrounding the inner region 11b. The inner region 11b and the outer region 12b have different shapes. The outer region 12b on the second surface 10b is defined as a region through which the beam passed through the outer region 12a on the first surface 10a passes.

The inner regions 11a and 11b are regions for attaining the NA required to obtain a beam spot diameter suitable for recording data to and/or reproducing data from the optical disc 20B.

Since the recording density of the optical disc 20A is higher than that of the optical disc 20B, a beam spot having a diameter smaller than that for the optical disc 20B is required to record data to and/or to reproduce data from the optical disc 20A. In this embodiment, the outer regions 12a and 12b are used for attaining an NA larger than that for the optical disc 20B and thereby forming a smaller beam spot on the data recording layer of the optical disc 20A. Further, in this embodiment the outer regions 12a and 12b are configured not to converge the second laser beam.

Each of the first and second surfaces 10a and 10b of the objective lens 10 is divided into two regions (the inter and outer regions) having different shapes. Therefore, the degree of freedom of a lens design increases, which enables to configure the objective lens 10 so that a coma caused when the beam is incident on the objective lens 10 obliquely with respect to the optical axis AX is sufficiently suppressed for each of the optical discs 20A and 20B.

The detailed configuration of the objective lens 10 for correcting the coma caused when the beam is incident on the objective lens 10 obliquely with respect to the optical axis of the objective lens 10 is as follows.

Considering that an extension 32a of the outer region 12a, extending from the outer region 12a toward the optical axis and indicated by a chain line in FIG. 2B, the inner region 11a is configured such that the amount of coma caused when the second laser beam is incident on the inner region 11a obliquely (at a first angle) with respect to the optical axis AX is less than the amount of coma caused when the second laser beam is incident on the extension 32a obliquely (at the first angle) with respect to the optical axis AX.

Similarly, considering that an extension 32b of the outer region 12b, extending from the outer region 12b toward the optical axis and indicated by a chain line in FIG. 2C, the inner region 11b is configured such that the amount of coma caused when the second laser beam is incident on the inner region 11b obliquely (at a first angle) with respect to the optical axis AX is less than the amount of coma caused when the second laser beam is incident on the extension 32b obliquely (at the first angle) with respect to the optical axis AX. That is, when the second laser beam is incident, obliquely with respect to the optical axis AX, on the first (second) surface 10a (10b) of the objective lens 10 at the boundary position P (see FIG. 19) between the inner region and the outer region, the amount of coma caused by the inner region is less than the amount of coma caused by the outer region.

In other words, the inner regions 11a and 11b correct the coma, caused when the optical disc 20B is used, more sufficiently than the coma caused when the optical disc 20A is used.

The outer regions 12a and 12b are configured to correct the coma caused when the optical disc 20A is used.

As described above, the objective lens 10 is configured to suppress the coma caused when the optical disc 20A is used as well as the coma caused when the optical disc 20B is used. Consequently, beam spots suitable for recording data to and/or reproducing data from the optical discs 20A and 20B are formed on the data recording layers of the optical discs 20A and 20B, respectively.

Figure 19:
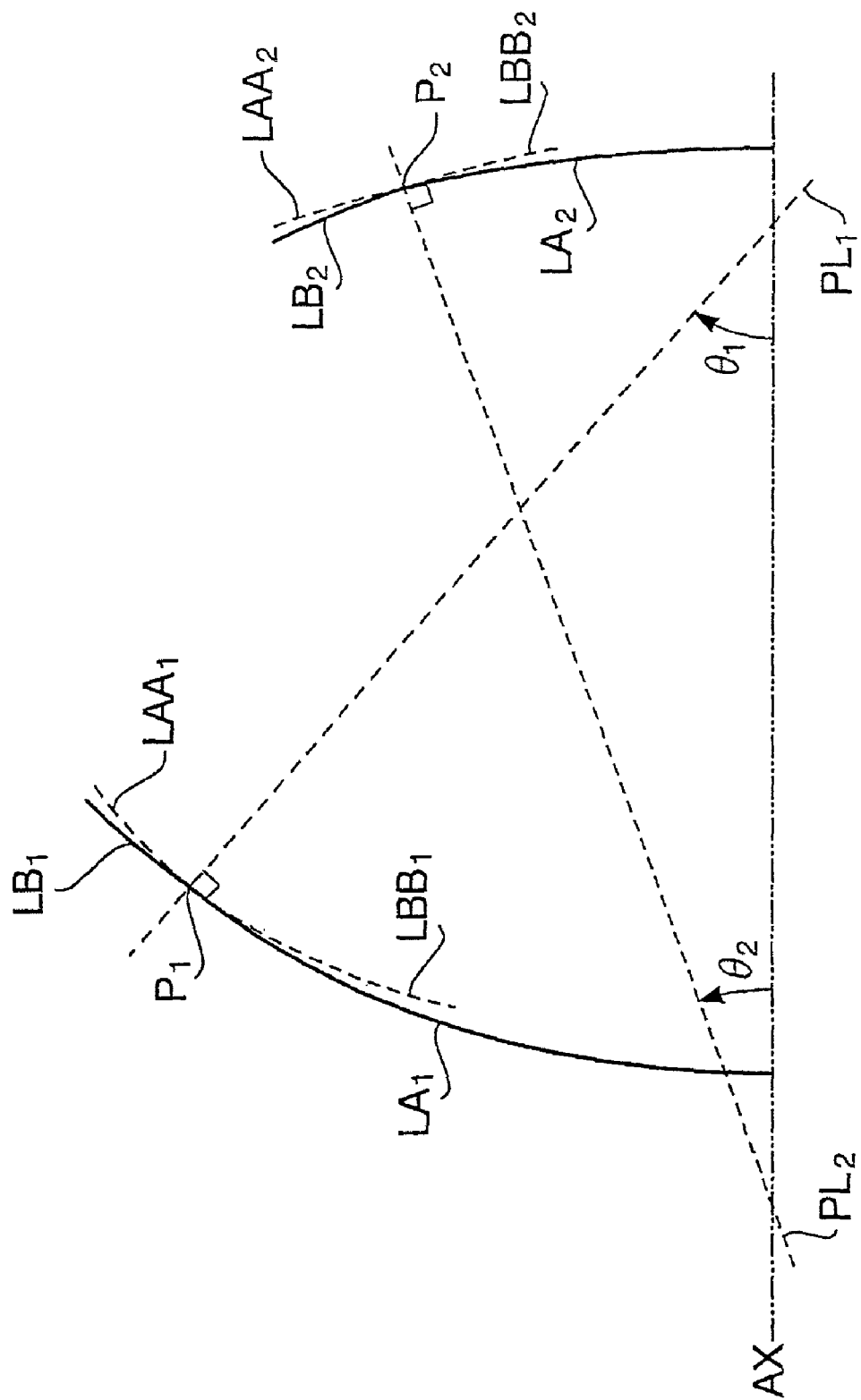
FIG. 19 is a cross section of the objective lens according to the first embodiment.

To explain the configuration of the objective lens 10 more specifically, an inclination θ of a lens surface is defined as indicated in FIG. 19. FIG. 19 is a cross section of the objective lens 10 including the optical axis AX. In FIG. 19, symbols have the following meanings.

"P" is a boundary position between the inner region (11a,11b) and the outer region (12a,12b).
"LA" represents the shape of the inner region (11a,11b).
"LAA" represents an extension of the inner region extended from the boundary position P toward the outer region.
"LB" represents the shape of the outer region (12a,12b).
"LBB" represents an extension of the outer region extended from the boundary position P toward the inner region.
"PL" represents a line normal to the lens surface (first surface 10a or the second surface 10b) at the boundary position P.
"θ" is the inclination of a lens surface. "θ" is an angle which is formed by a line normal to the lens surface with respect to the optical axis AX.
Numerical subscripts "1" and "2" of each symbol represent the first surface 10a and the second surface 10b, respectively.

The inclination of the inner region at the boundary position means that an angle formed by a line (PL) normal to the lens surface defined by the LA and LAA at the boundary position P with respect to the optical axis AX. The inclination of the outer region at the boundary position means that an angle formed by a line (PL) normal to the lens surface defined by the LB and LBB at the boundary position P with respect to the optical axis AX.

The inclination θ has a plus sign when it is measured in a clockwise direction with respect to the optical axis AX, and has a minus sign when it is measured in a counterclockwise direction with respect to the optical axis AX.

The words "a coma caused at the boundary position" as used herein means that a coma caused at a point nearest to the boundary position on the inner region or on the outer region on one of the first surface and the second surface of the objective lens.

The second surface 10b of the objective lens 10 is configured such that at the boundary position $P_2$ the inclination $\theta_2$ of the outer region 12b is smaller than the inclination $\theta_2$ of the inner region 11b.

More specifically, the objective lens 10 is configured such that, at the boundary position Pb between the inner region 11b and the outer region of the second surface 10b, the inclination $\theta_{2A}$ [degree] of the inner region 11b of the second surface 10b and the inclination $\theta_{2B}$ [degree] of the outer region 12b of the second surface 10b satisfy the following condition (1).

$$-2.5<\theta_{2B}-\theta_{2A}<0.0 \tag{1}$$

When the $\theta_{2B}-\theta_{2A}$ gets larger than the upper limit of the condition (1), the effect of correction of the coma decreases for each of the optical discs 20A and 20B. When the $\theta_{2B}-\theta_{2A}$ gets lower than the lower limit of the condition (1), the coma is caused particularly when the optical disc 20A is used.

In addition to satisfying the condition (1), the objective lens 10 may be configured such that the inclination $\theta_{1A}$ [degree] of the inner region 11a and the inclination $\theta_{1B}$ [degree] of the outer region 12a of the first surface 10a satisfy the following condition (2).

$$-1.2<\theta_{1B}-\theta_{1A}<0.0 \tag{2}$$

When $\theta_{1B}-\theta_{1A}$ gets larger than the upper limit of the condition (2), the effect of correction of the coma decreases for each of the optical discs 20A and 20B. When the $\theta_{1B}-\theta_{1A}$ gets lower than the lower limit of the condition (2), the coma is caused particularly when the optical disc 20A is used.

As shown in FIG. 2B, the objective lens 10 may be configured to have a diffracting structure of the first surface 10a. When the objective lens 10 is configured to have the diffracting structure on the first surface 10a, the diffracting structure formed within the inner region 11a and the diffracting structure formed within the outer region 12a have structures different from each other.

The diffracting structure formed within the inner region 11a is configured such that the first and second laser beams are suitably converged onto the data recording layers of the optical discs 20A and 20B, respectively. The diffracting structure formed within the outer region 12a is configured to suitably converge the first laser beam onto the data recording layer of the optical disc 20A and to diffuse the second laser beam incident thereon (i.e., the outer region 12a does not contribute to the formation of the beam spot for the optical disc 20B).

The diffracting structure formed within the outer region 12a is configured such that a wavefront of the first laser beam passed through the outer region 12a is continuously connected to a wavefront of the first laser beam passed through the inner region 11a.

With the above mentioned configuration, a portion of the second laser beam passed through the inner region 11a is suitably converged by the objective lens 10 onto the data recording layer of the optical disc 20B. Consequently, the beam spot suitably for recording data to and/or reproducing data from the optical disc 20B is formed on the data recording layer of the optical disc 20B. The first laser beam passed through the objective lens 10 forms the beam spot, suitable for recording data to and/or reproducing data from the optical disc 20A, on the data recording layer of the optical disc 20A.

Although, in the above mentioned first embodiment, the collimated beam is used for each of the optical discs 20A and 20B, the optical system may be configured such that a beam other than the collimated beam is incident on the objective lens 10 while the optical system satisfying a condition where magnifications for both of the optical discs 20A and 20B are the same.

Hereafter, two concrete examples according to the first embodiment of the invention will be described. In the following examples, the thicknesses of the cover layers of the optical discs 20A and 20B are 0.6 mm and 1.2 mm, respectively.

First Example

Performance specifications of the objective lens 10 according to a first example are shown in Table 1.

TABLE 1

|  | First laser beam | Second laser beam |
| --- | --- | --- |
| Design wavelength | 657 nm | 790 nm |
| Focal length f | 3.360 | 3.384 |
| NA | 0.600 | 0.466 |
| magnification | 0.000 | 0.000 |

In Table 1 (and in the following similar Tables), the design wavelength is a wavelength suitable for the recordation/reproduction of the optical disc, f represents a focal length (unit:mm) of the objective lens 10. NA represents the numerical aperture. In Table 1, the performance specifications are indicated with regard to each of the first laser beam (the optical disc 20A) and the second laser beam (the optical disc 20B).

Table 2 shows a numerical configuration of the optical system of the optical disc drive including the objective lens 10 when the optical disc 20A is used. Table 3 shows a numerical configuration of the optical system of the optical disc drive including the objective lens 10 when the optical disc 20B is used.

TABLE 2

| Surface Number | r | d | n (657 nm) | n (790 nm) |
| --- | --- | --- | --- | --- |
| #0 |  | ∞ |  |  |
| #1(h ≦ 1.58) | 2.101 | 2.21 | 1.54056 | 1.53653 |
| #1(1.58 ≦ h) | 2.112 |  |  |  |
| #2(h ≦ 1.14) | −8.459 | 1.74 |  |  |
| #2(1.14 ≦ h) | −8.450 |  |  |  |
| #3 | ∞ | 0.60 | 1.57982 | 1.57307 |
| #4 | ∞ | — |  |  |

TABLE 3

| Surface Number | r | d | n (657 nm) | n (790 nm) |
| --- | --- | --- | --- | --- |
| #0 |  | ∞ |  |  |
| #1(h ≦ 1.58) | 2.101 | 2.21 | 1.54056 | 1.53653 |
| #1(1.58 ≦ h) | 2.112 |  |  |  |
| #2(h ≦ 1.14) | −8.459 | 1.38 |  |  |
| #2(1.14 ≦ h) | −8.450 |  |  |  |
| #3 | ∞ | 1.20 | 1.57982 | 1.57307 |
| #4 | ∞ | — |  |  |

In Tables 2 and 3, "surface number" represents a surface number of each surface of optical components in the optical system. In Tables 2 and 3, a surface #0 represents the light source, and surfaces #1 and #2 represent the first surface 10a and the second surface 10b of the objective lens 10, respectively. In Table 2, surfaces #3 and #4 represent the cover layer and the data recording layer of the optical disc 20A, respectively. In Table 3, surfaces #3 and #4 represent the cover layer and the data recording layer of the optical disc 20B, respectively.

In Tables 2 and 3 (and in the following similar Tables), "r" represents a radius of curvature (unit: mm) of each lens surface on the optical axis. "d" represents a thickness of a lens or a distance (unit: mm) from a lens surface to a next lens surface. "n" represents a refractive index which is indicated for each of wavelengths of the first and second laser beams.

As shown in Tables 2 and 3, the first surface 10a of the objective lens 10 is divided into the inner region 11a and the outer region 12a, which are defined by the height h (mm) from the optical axis (AX) as follows.
inner region 11a: h≦1.58
outer region 12a: 1.58≦h Similarly, as shown in Tables 2 and 3, the second surface 10b of the objective lens 10 is divided into the inner region 11b and the outer region 12b, which are defined by the height h (mm) from the optical axis (AX) as follows.
inner region 11b: h≦1.14
outer region 12b: 1.14≦h The first surface 10a (#1) and the second surface 10b (#2) of the objective lens 10 are aspherical surfaces. The inner region 11a and the outer region 12a of the first surface 10a are configured to be different aspherical shapes. Also, the inner region 11b and the outer region 12b of the second surface 10b are configured to be different aspherical shapes.

The aspherical surface is expressed by a following equation:

$$X(h) = \frac{ch^2}{1+\sqrt{1-(1+K)c^2h^2}} + A_4h^4 + A_6h^6 A_8h^8 + A_{10}h^{10} + A_{12}h^{12}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4, A_6, A_8, A_{10}$ and $A_{12}$ are aspherical coefficients of fourth, sixth, eighth, tenth and twelfth orders, respectively.

Table 4 shows the conical coefficients and aspherical coefficients of the first surface 10a (#1) and the second surface 10b (#2) of the objective lens 10 according to the first example.

TABLE 4

| | Surface No. | | | |
| --- | --- | --- | --- | --- |
|  | #1 (h ≦ 1.58) | #1 (1.58 ≦ h) | #2 (h ≦ 1.14) | #2 (1.14 ≦ h) |
| K | −0.5000 | −0.5000 | 0.0000 | 0.0000 |
| A4 | −2.3550E−03 | −1.1290E−03 | 1.2690E−02 | 1.4360E−02 |
| A6 | −1.9490E−04 | −8.6690E−05 | −8.1610E−04 | −2.0470E−03 |
| A8 | 8.8930E−06 | −8.9330E−05 | 8.9730E−05 | −3.6610E−04 |
| A10 | 3.3930E−06 | 2.0383E−05 | −1.7630E−05 | 1.2890E−04 |
| A12 | 6.6810E−08 | −5.6202E−06 | 1.0025E−06 | −1.1338E−05 |

In Table 4 (and in the following similar Tables), a notation symbol E indicates that 10 is used as a radix and a right side value of E is used as an exponent.

The first surface 10a of the objective lens 10 has a diffracting structure. The diffracting structure is expressed by an optical path difference function Φ(h):

$$\Phi(h) = (P_2 h^2 + P_4 h^4 + P_6 h^6 + \ldots) m\lambda$$

where $P_2$, $P_4$ and $P_6$ are coefficients of second, fourth and sixth orders, h represents a height from the optical axis, m represents a diffraction order, and λ represents a working wavelength. The optical path difference Φ(h) indicates a difference of an optical path length of a hypothetical ray of light which does not pass through the diffracting structure and an optical path length of a ray of light which is diffracted by the diffracting structure, at the height h from the optical axis. In other words, the optical path difference Φ(h) represents the additional optical path length of each ray of light which is diffracted by the diffracting structure. "m" represents the diffraction order used for the recording and/or reproducing operation. In this example, m is 1.

Table 5 shows values of the coefficients of the optical path difference function Φ(h) applied to the diffracting structure formed within the inner region 11a and the outer region 12a of the first surface 10a (#1).

TABLE 5

| coefficient | #1 (h ≦ 1.58) | #1 (1.58 ≦ h) |
|---|---|---|
| P2 | 0.0000E+00 | −9.9918E−01 |
| P4 | −1.6568E+00 | −8.7030E−01 |
| P6 | −1.3534E−01 | −1.5720E−01 |
| P8 | 0.0000E+00 | 0.0000E+00 |
| P10 | 0.0000E+00 | 0.0000E+00 |
| P12 | 0.0000E+00 | 0.0000E+00 |

In this example, at the boundary position Pb between the inner region 11b and the outer region 12b of the second surface 10b, the inclination $\theta_{2A}$ [degree] of the inner region 11b of the second surface 10b is −3.94 [degree], and the inclination $\theta_{2B}$ [degree] of the outer region 12b of the second surface 10b is −4.48 [degree]. In this case, $\theta_{2B} - \theta_{2A} = -0.52$ [degree]. Therefore, in this example, the condition (1) is satisfied. In this example, the condition (2) is also satisfied.

Figure 3A:
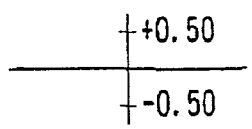
FIG. 3A is a graph illustrating a wavefront aberration of an on-axis ray caused in the optical system according to a first example when the first optical disc is used.
Figure 3B:
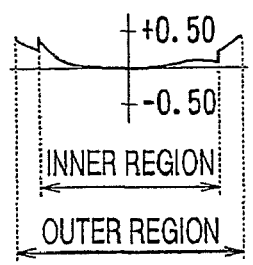
FIG. 3B is a graph illustrating a wavefront aberration of an off-axis ray caused in the optical system according to the first example when the first optical disc is used.
Figure 4A:
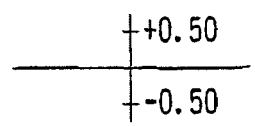
FIG. 4A is a graph illustrating a wavefront aberration of an on-axis ray caused in the optical system according to the first example when the second optical disc is used.
Figure 4B:
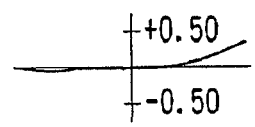
FIG. 4B is a graph illustrating a wavefront aberration of an off-axis ray caused in the optical system according to the first example when the second optical disc is used.

FIGS. 3A and 3B are graphs illustrating wavefront aberrations caused in the optical system according to the first example when the optical disc 20A is used. FIGS. 4A and 4B are graphs illustrating wavefront aberrations caused in the optical system according to the first example when the optical disc 20B is used. Each of FIGS. 3A and 4A shows the wavefront aberration regarding an on-axis ray, and each of FIGS. 3B and 4B shows the wavefront aberration regarding an off-axis ray (at an image height of 0.06 mm).

An objective lens according to a first comparative example is considered as follows for comparing with the objective lens 10 according the first example. The objective lens according to the first comparative example has substantially the same configuration as that of the objective lens 10 of the first example, but a second surface (an optical disc side surface) thereof is configured to be a single continuous surface. That is, the second surface of the objective lens according to the first comparative example is not divided into an inner region and an outer region.

Figure 5A:
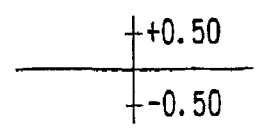
FIG. 5A is a graph illustrating a wavefront aberration of an on-axis ray caused in the optical system according to a first comparative example when the first optical disc is used.
Figure 5B:
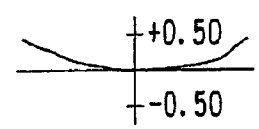
FIG. 5B is a graph illustrating a wavefront aberration of an off-axis ray caused in the optical system according to the first comparative example when the first optical disc is used.
Figure 6A:
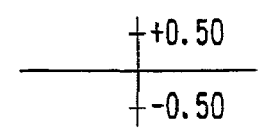
FIG. 6A is a graph illustrating a wavefront aberration of an on-axis ray caused in the optical system according to the first comparative example when the second optical disc is used.
Figure 6B:
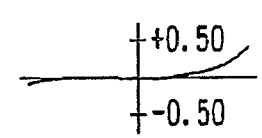
FIG. 6B is a graph illustrating a wavefront aberration of an off-axis ray caused in the optical system according to the first comparative example when the second optical disc is used.

FIGS. 5A and 5B are graphs illustrating wavefront aberrations caused in an optical system having an objective lens according to the first comparative example when the optical disc 20A is used. FIGS. 6A and 6B are graphs illustrating wavefront aberrations caused in the optical system according to the first comparative example when the optical disc 20B is used. Each of FIGS. 5A and 6A shows the wavefront aberration regarding an on-axis ray, and each of FIGS. 5B and 6B shows the wavefront aberration regarding an off-axis ray (at an image height of 0.06 mm).

Figure 7:
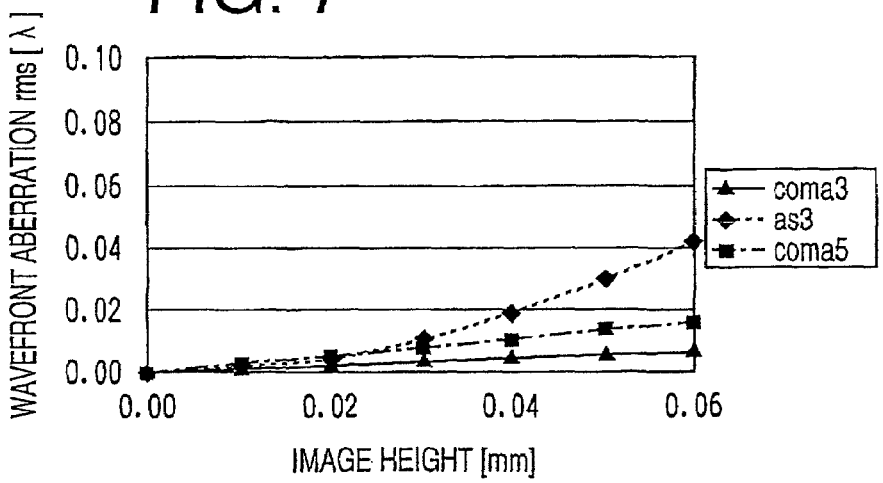
FIG. 7 is a graph illustrating a relationship between the wavefront aberration of the first example and the image height when the first optical disc is used.
Figure 8:
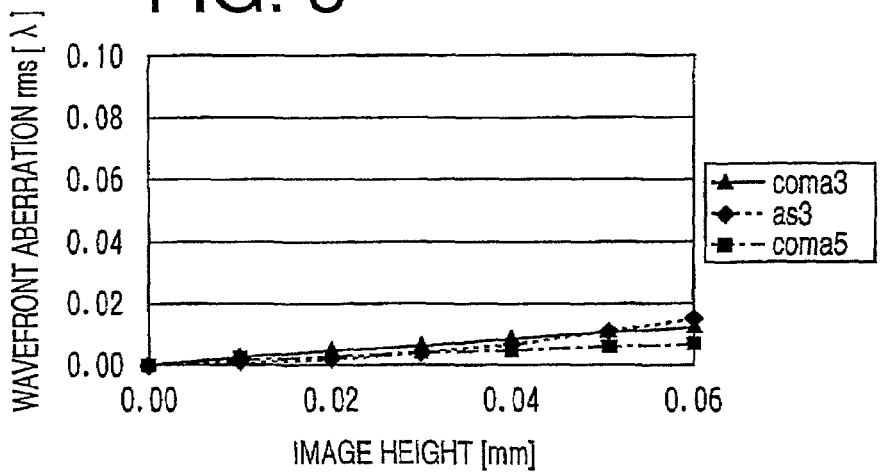
FIG. 8 is a graph illustrating a relationship between the wavefront aberration of the first example and the image height when the second optical disc is used.

FIGS. 7 and 8 show the wavefront aberrations caused in the first example when the optical discs 20A and 20B are used, respectively. More specifically, FIG. 7 is a graph illustrating a relationship between the wavefront aberration rms[λ] and the image height [mm] when the optical disc 20A is used. FIG. 8 is a graph illustrating a relationship between the wavefront aberration rms[λ] and the image height [mm] when the optical disc 20B is used.

Figure 9:
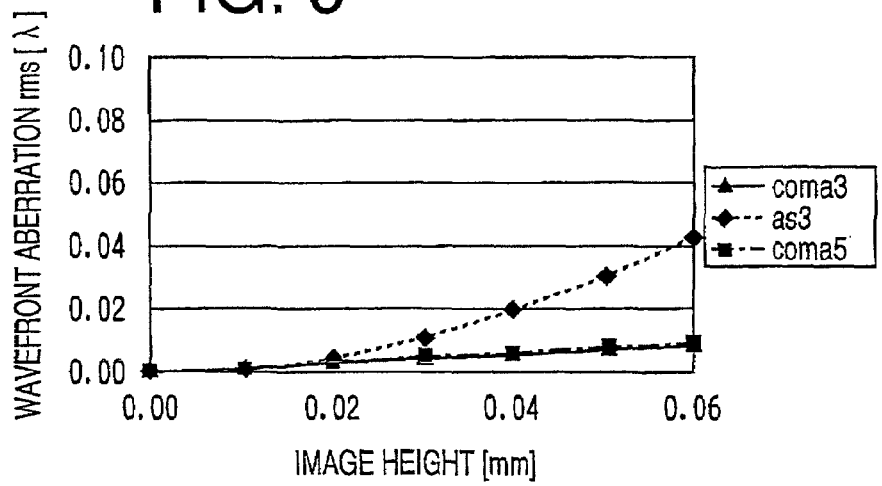
FIG. 9 is a graph illustrating a relationship between the wavefront aberration of the first comparative example and the image height when the first optical disc is used.
Figure 10:
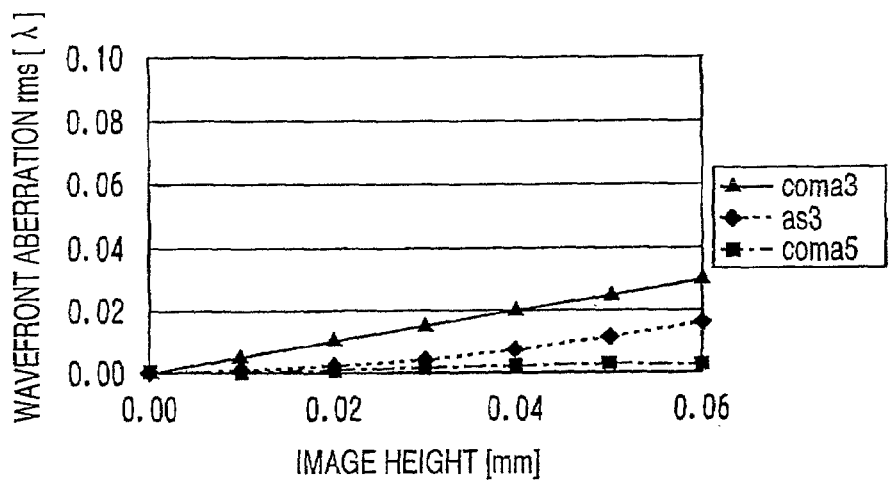
FIG. 10 is a graph illustrating a relationship between the wavefront aberration of the first comparative example and the image height when the second optical disc is used.

FIGS. 9 and 10 show the wavefront aberrations caused in the optical system including the objective lens according to the first comparative example when the optical discs 20A and 20B are used, respectively. FIG. 9 is a graph illustrating a relationship between the wavefront aberration rms[λ] and the image height [mm] when the optical disc 20A is used in the optical system including the objective lens according to the first comparative example. FIG. 10 is a graph illustrating a relationship between the wavefront aberration rms[λ] and the image height [mm] when the optical disc 20B is used in the optical system including the objective lens according to the first comparative example.

In each of FIGS. 7-10 (and in the following similar drawings), a curve indicated by a "coma 3" represents the coma of the third order, a curve indicated by an "as 3" represents an astigmatism of the third order, and a curve indicated by a "coma 5" represents the coma of the fifth order.

The amount of the wavefront aberration caused when the optical disc 20A is used is analyzed as follows by making a comparison between FIG. 7 and FIG. 9. The coma of the third order caused in the case of the first example is reduced to a level substantially equal to the coma of the third order caused in the case of the first comparative example.

The amount of the wavefront aberration caused when the optical disc 20B is used is analyzed as follows by making a comparison between FIG. 8 and FIG. 10. The coma of the third order caused in the case of the first example is reduced more sufficiently than the coma of the third order caused in the case of the first comparative example. That is, the amount of the wavefront aberration caused in the case of the first example is reduced more sufficiently than the wavefront aberration caused in the case of the first comparative example.

Therefore, according to the first example, the coma of the third order is sufficiently suppressed for both of the optical discs 20A and 20B. Consequently, beam spots suitable for recording data to and/or reproducing data from the optical discs 20A and 20B can be formed on the data recording layers of the optical discs 20A and 20b, respectively.

Although the coma of the fifth order caused in the case of the first example is slightly larger than the coma of the fifth order caused in the cased of the first comparative example, the amount of the coma of the fifth order caused in the case of the first example does not affect the formation of the suitable beam spots for the optical discs 20A and 20B.

Second Example

Performance specifications of the objective lens 10 according to a second example are shown in Table 6.

TABLE 6

|  | First laser beam | Second laser beam |
|---|---|---|
| Design wavelength | 657 nm | 790 nm |
| Focal length f | 3.360 | 3.384 |
| NA | 0.600 | 0.467 |
| magnification | 0.000 | 0.000 |

Table 7 shows a numerical configuration of an optical system of an optical disc drive including the objective lens 10 according to the second example when the optical disc 20A is used. Also, Table 8 shows a numerical configuration of the optical system of the optical disc drive including the objective lens 10 according to the second example when the optical disc 20B is used.

TABLE 7

| Surface Number | r | d | n (657 nm) | n (790 nm) |
|---|---|---|---|---|
| #0 | ∞ |  |  |  |
| #1(h ≦ 1.58) | 2.1090 | 2.21 | 1.54056 | 1.53653 |
| #1(1.58 ≦ h) | 2.1080 |  |  |  |
| #2(h ≦ 1.15) | −8.2760 | 1.75 |  |  |
| #2(1.15 ≦ h) | −8.3147 |  |  |  |
| #3 | ∞ | 0.60 | 1.57982 | 1.57307 |
| #4 | ∞ | — |  |  |

TABLE 8

| Surface Number | r | d | n (657 nm) | n (790 nm) |
|---|---|---|---|---|
| #0 | ∞ |  |  |  |
| #1(h ≦ 1.58) | 2.1090 | 2.21 | 1.54056 | 1.53653 |
| #1(1.58 ≦ h) | 2.1080 |  |  |  |
| #2(h ≦ 1.15) | −8.2760 | 1.40 |  |  |
| #2(1.15 ≦ h) | −8.3147 |  |  |  |
| #3 | ∞ | 1.20 | 1.57982 | 1.57307 |
| #4 | ∞ | — |  |  |

In Tables 7 and 8, "surface number" represents a surface number of each surface of optical components in the optical system. In Tables 7 and 8, a surface #0 represents the light source, and surfaces #1 and #2 represent the first surface 10a and the second surface 10b of the objective lens 10, respectively. In Table 7, surfaces #3 and #4 represent the cover layer and the data recording layer of the optical disc 20A, respectively. In Table 8, surfaces #3 and #4 represent the cover layer and the data recording layer of the optical disc 20B, respectively.

As shown in Tables 7 and 8, the first surface 10a of the objective lens 10 is divided into the inner region 11a and the outer region 12a, which are defined by the height h (mm) from the optical axis (AX) as follows.
inner region 11a: h≦1.58
outer region 12a: 1.58≦h Similarly, as shown in Tables 7 and 8, the second surface 10b of the objective lens 10 is divided into the inner region 11b and the outer region 12b, which are defined by the height h (mm) from the optical axis (AX) as follows.
inner region 11b: h≦1.15
outer region 12b: 1.15≦h The first surface 10a (#1) and the second surface 10b (#2) of the objective lens 10 are aspherical surfaces which are defined by the above mentioned equation. Further, the inner region 11a and the outer region 12a of the first surface 10a are configured to be different aspherical shapes. Also, the inner region 11b and the outer region 12b of the second surface 10b are configured to be different aspherical shapes.

Table 9 shows the conical coefficients and aspherical coefficients of the first surface 10a (#1) and the second surface 10b (#2) of the objective lens 10 according to the second example.

TABLE 9

| | Surface No. | | | |
|---|---|---|---|---|
| | #1 (h ≦ 1.58) | #1 (1.58 ≦ h1) | #2 (h ≦ 1.15) | #2 (1.15 ≦ h) |
| K | −0.5000 | −0.5000 | 0.0000 | 0.0000 |
| A4 | −2.4820E−04 | −2.4410E−04 | 1.3570E−02 | 1.3530E−02 |
| A6 | 7.2160E−05 | 2.7270E−05 | −9.8090E−04 | −1.7710E−03 |
| A8 | 2.3780E−05 | −5.2640E−06 | 2.0850E−05 | −6.4380E−05 |
| A10 | 2.8940E−06 | 1.5870E−06 | −7.9860E−06 | 5.4570E−05 |
| A12 | 7.7610E−08 | −1.2972E−06 | 1.4650E−06 | −5.3289E−06 |

In this example, at the boundary position Pa between the inner region 11a and the outer region 12a of the first surface 10a, the inclination $\theta_{1A}$ [degree] of the inner region 11a of the first surface 10a is 41.57 [degree], and the inclination $\theta_{1B}$ [degree] of the outer region 12a of the first surface 10a is 41.22 [degree]. In this case, $\theta_{1B}-\theta_{1A}=-0.35$ [degree]. Therefore, the condition (2) is satisfied.

In this example, at the boundary position Pb between the inner region 11b and the outer region 12b of the second surface 10b, the inclination $\theta_{2A}$ [degree] of the inner region 11b of the second surface 10b is −7.75 [degree], and the inclination $\theta_{2B}$ [degree] of the outer region 12b of the second surface 10b is −7.77 [degree]. In this case, $\theta_{2B}-\theta_{2A}=-0.02$ [degree]. Therefore, the condition (1) is satisfied.

Figure 11A:
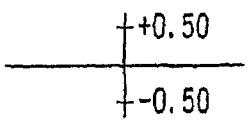
FIG. 11A is a graph illustrating a wavefront aberration of an on-axis ray caused in the optical system according to a second example when the first optical disc is used.
Figure 11B:
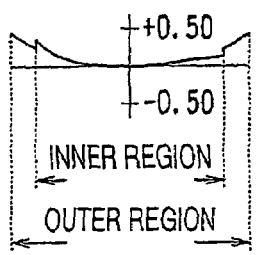
FIG. 11B is a graph illustrating a wavefront aberration of an off-axis ray caused in the optical system according to the second example when the first optical disc is used.
Figure 12A:
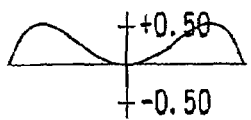
FIG. 12A is a graph illustrating a wavefront aberration of an on-axis ray caused in the optical system according to the second example when the second optical disc is used.
Figure 12B:
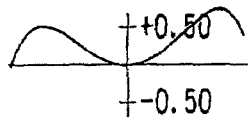
FIG. 12B is a graph illustrating a wavefront aberration of an off-axis ray caused in the optical system according to the second example when the second optical disc is used.

FIGS. 11A and 11B are graphs illustrating wavefront aberrations caused in the optical system according to the second example when the optical disc 20A is used. FIGS. 12A and 12B are graphs illustrating wavefront aberrations caused in the optical system according to the second example when the optical disc 20B is used. Each of FIGS. 11A and 12A shows the wavefront aberration regarding an on-axis ray, and each of FIGS. 11B and 12B shows the wavefront aberration regarding an off-axis ray (at an image height of 0.06 mm).

An objective lens according to a second comparative example is considered as follows for comparing with the objective lens 10 according the second example. The objective lens according to the second comparative example has substantially the same configuration as that of the objective lens 10 of the second example, but a second surface (an optical disc side surface) thereof is configured to be a single continuous surface. That is, the second surface of the objective lens according to the second comparative example is not divided into an inner region and an outer region.

Figure 13A:
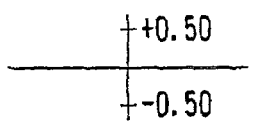
FIG. 13A is a graph illustrating a wavefront aberration of an on-axis ray caused in the optical system according to a second comparative example when the first optical disc is used.
Figure 13B:
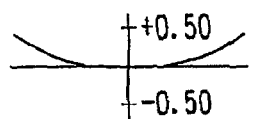
FIG. 13B is a graph illustrating a wavefront aberration of an off-axis ray caused in the optical system according to the second comparative example when the first optical disc is used.
Figure 14A:
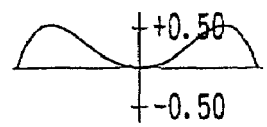
FIG. 14A is a graph illustrating a wavefront aberration of an on-axis ray caused in the optical system according to the second comparative example when the second optical disc is used.
Figure 14B:
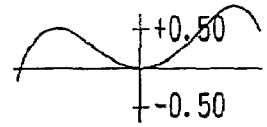
FIG. 14B is a graph illustrating a wavefront aberration of an off-axis ray caused in the optical system according to the second comparative example when the second optical disc is used.

FIGS. 13A and 13B are graphs illustrating wavefront aberrations caused in an optical system having an objective lens according to the second comparative example when the optical disc 20A is used. FIGS. 14A and 14B are graphs illustrating wavefront aberrations caused in the optical system according to the second comparative example when the optical disc 20B is used. Each of FIGS. 13A and 14A shows the wavefront aberration regarding an on-axis ray, and each of FIGS. 13B and 14B shows the wavefront aberration regarding an off-axis ray (at an image height of 0.06 mm).

Figure 15:
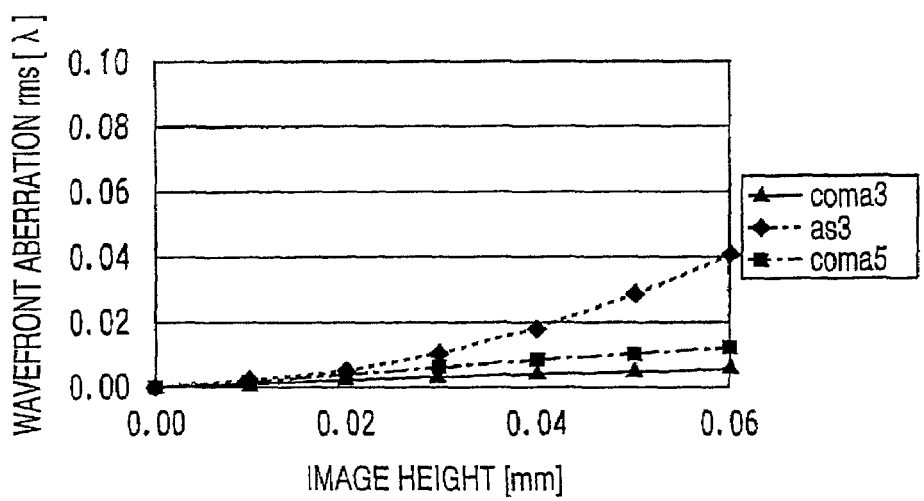
FIG. 15 is a graph illustrating a relationship between the wavefront aberration of the second example and the image height when the first optical disc is used.
Figure 16:
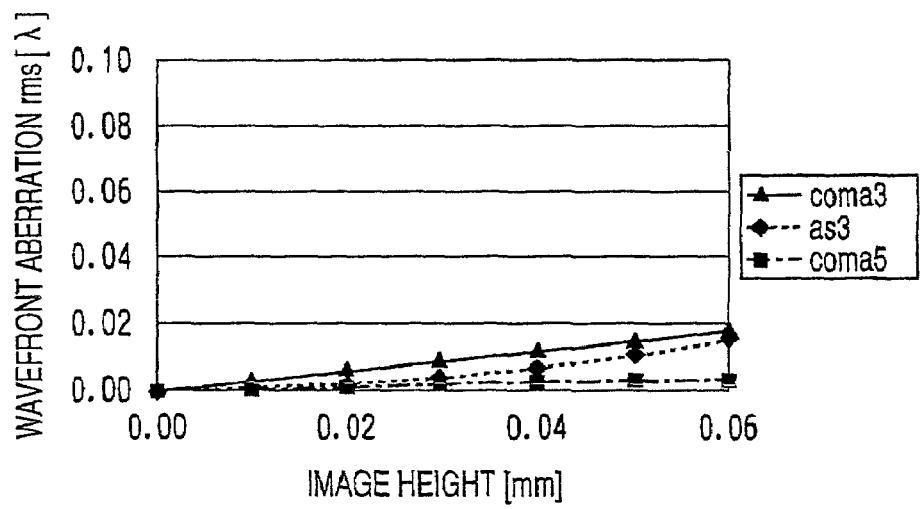
FIG. 16 is a graph illustrating a relationship between the wavefront aberration of the second example and the image height when the second optical disc is used.

FIGS. 15 and 16 respectively show the wavefront aberrations caused in the second example when the optical discs 20A and 20B are used. More specifically, FIG. 15 is a graph illustrating a relationship between the wavefront aberration rms[λ] and the image height [mm] when the optical disc 20A is used. FIG. 16 is a graph illustrating a relationship between the wavefront aberration rms[λ] and the image height [mm] when the optical disc 20B is used.

Figure 17:
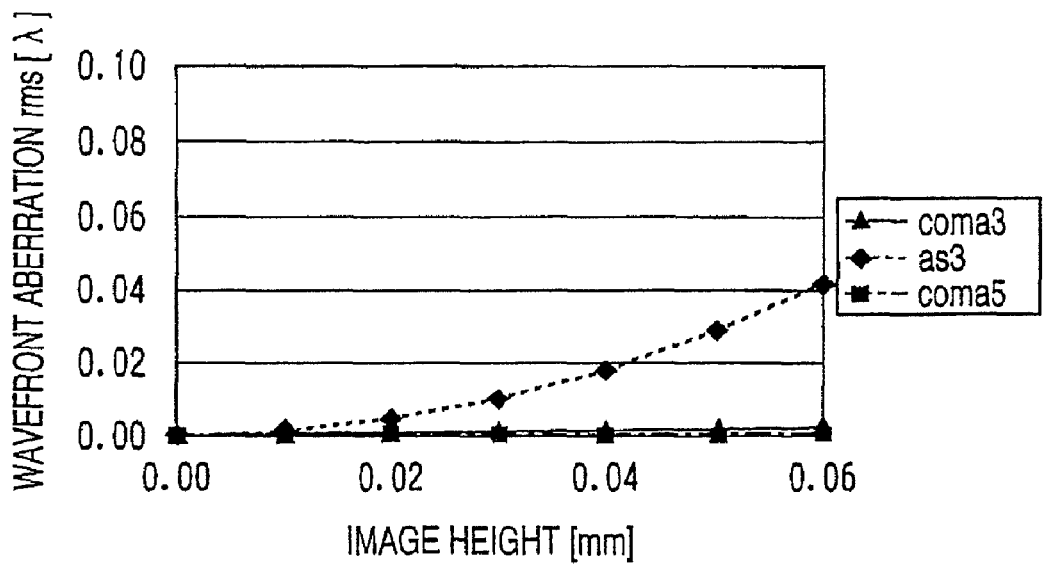
FIG. 17 is a graph illustrating a relationship between the wavefront aberration of the second comparative example and the image height when the first optical disc is used.
Figure 18:
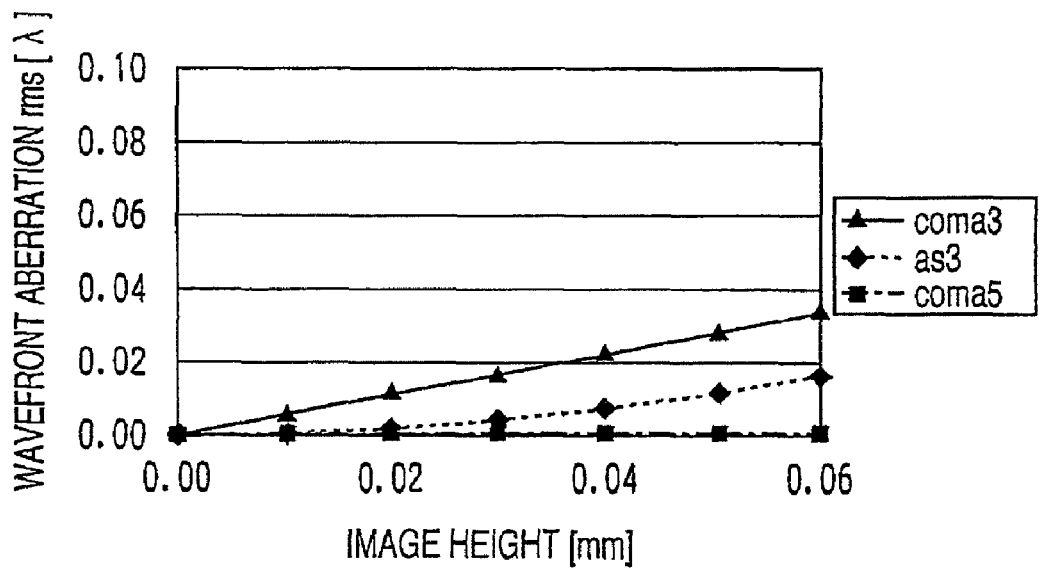
FIG. 18 is a graph illustrating a relationship between the wavefront aberration of the second comparative example and the image height when the second optical disc is used.

FIGS. 17 and 18 respectively show the wavefront aberrations caused, in the optical system including the objective lens according to the second comparative example, when the optical discs 20A and 20B are used. FIG. 17 is a graph illustrating a relationship between the wavefront aberration rms[λ] and the image height [mm] when the optical disc 20A is used in the optical system including the objective lens according to the second comparative example. FIG. 18 is a graph illustrating a relationship between the wavefront aberration rms[λ] and the image height [mm] when the optical disc 20B is used in the optical system including the objective lens according to the second comparative example.

The amount of the wavefront aberration caused when the optical disc 20A is used is analyzed as follows by making a comparison between FIG. 15 and FIG. 17. Although the coma of the third order caused in the case of the second example is slightly larger than the coma of the third order caused in the case of the second comparative example, the coma of the third order caused in the second example is sufficiently suppressed.

The amount of the wavefront aberration caused when the optical disc 20B is used is analyzed as follows by making a comparison between FIG. 16 and FIG. 18. The coma of the third order caused in the case of the second example is reduced more sufficiently than the coma of the third order caused in the case of the second comparative example.

Therefore, according to the second example, the coma of the third order is sufficiently suppressed for both of the optical discs 20A and 20B. Consequently, beam spots suitable for recording data to and/or reproducing data from the optical discs 20A and 20B can be formed on the data recording layers of the optical discs 20A and 20b, respectively.

Second Embodiment

Figure 21A:
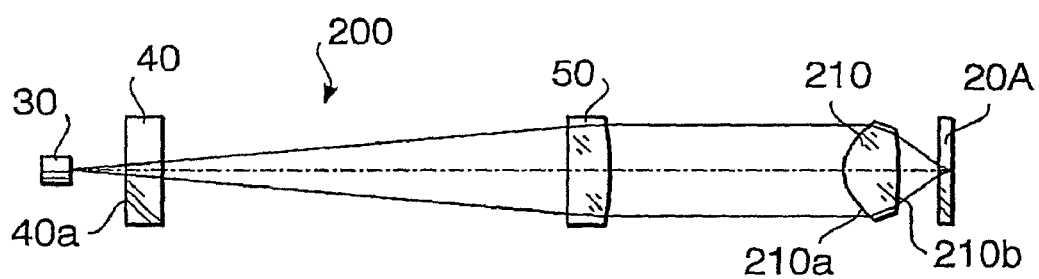
FIG. 21A shows a configuration of an optical system according to the second embodiment when the first optical disc is used.
Figure 21B:
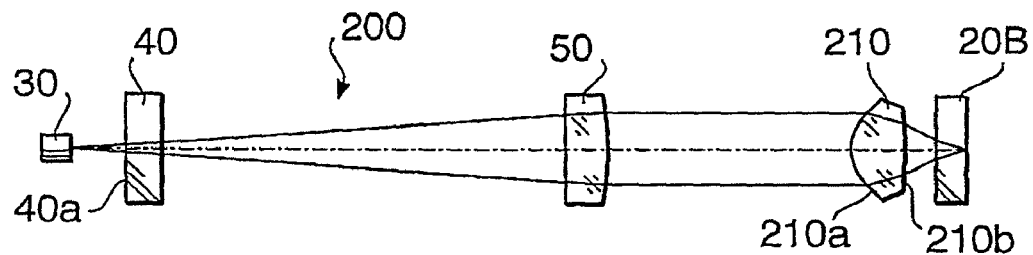
FIG. 21B shows a configuration of the optical system according to the second embodiment when the second optical disc is used.

Hereafter, a second embodiment of the invention will be described. Each of FIGS. 21A and 21B show an optical system 200 including an objective lens 210 according to a second embodiment of the invention. The objective lens 210 is used for recording data to and/or reproducing data from a plurality of types of optical discs. FIG. 21A shows a configuration of the optical system 200 when an optical disc 20A is used. That is, the FIG. 21A shows an optical path when the optical disc 20A is used. FIG. 21B shows a configuration of the optical system 200 when an optical disc 20B is used. That is, the FIG. 21B shows an optical path when the optical disc 20A is used.

Similarly to the first embodiment, the optical disc 20A is, for example, the DVD having a cover layer whose thickness is thinner than that of the CD. The optical disc 20B is, for example, the CD having a relatively thick cover layer.

As shown in FIGS. 21A and 21B, the optical system 200 includes a light source 30, a branching element 40, a coupling lens 50 and the objective lens 210. The optical system 200 is mounted on an optical disc drive used for recording data to and/or reproducing data from the plurality of types of optical discs. The optical disc 20A or 20B is placed on a turn table (not shown) in the optical disc drive when the recording and/or reproducing operation is performed.

When recording and/or reproducing operation for the optical disc 20A is performed a laser beam having a relatively short wavelength (hereafter, referred to as a first laser beam) is emitted from the light source 30 so as to form a relatively small beam spot on a data recording layer of the optical disc 20A. The wavelength of the first laser beam is, for example, 657 nm. When recording and/or reproducing operation for the optical disc 20B is performed a laser beam (hereafter, referred to as a second laser beam) having a wavelength longer than that of the first laser beam is emitted from the light source 30 so as to form a relatively large beam spot on a data recording layer of the optical disc 20B. The wavelength of the second laser beam is, for example, 790 nm.

The light source 30 has two light emitting portions which emit the first and second laser beams, respectively. One light emitting portion for the first laser beam is located on an optical axis of the objective lens 210. The other light emitting portion for the second laser beam slightly shifts from the optical axis. Therefore, the second laser beam is incident on the objective lens 210 obliquely with respect to the optical axis of the objective lens 210.

The first or second laser beam emitted by the light source 30 is incident on the coupling lens 50 via the branching element 40, and a divergence of the laser beam is changed by the coupling lens 50. The first laser beam is converged by the objective lens 210 onto the data recording layer of the optical disc 20A. The second laser beam is converged by the objective lens 210 onto the data recording layer of the optical disc 20B.

Since the collimated beam or a slightly diverging beam is incident on the objective lens 210, aberrations including a spherical aberration and a coma, caused when the objective lens 210 is shifted vertically in FIG. 21A or 21B from a reference axis (indicated by a chain line in FIGS. 21A and 21B) of the optical system 200 by tracking operation, are sufficiently small.

A returning beam reflected from the data recording layer of the optical disc 20A or 20B passes through the objective lens 210 and the coupling lens 50, and then is incident on the branching element 40 again. The branching element 40 has, for example, a diffraction element having a diffraction grating on its light source side surface 40a.

The returning beam incident on the branching element 40 is diffracted by the diffraction grating on the surface 40a and is thereby deviated from the optical path along which the laser beam emitted by the light source 30 proceeds toward the branching element 40. Finally, the returning beam is incident on a photoreceptor (not shown) located in the vicinity of the light source 30.

The objective lens 210 is a biconvex plastic single lens having a first surface 210a located on a light source side and a second surface 210b located on an optical disc side. Both of the first and second surfaces 210a and 210b are aspherical surfaces.

Since as described above the thicknesses of the cover layers of the optical discs 20A and 20B are different from each other, the coma and the spherical aberration change depending on the type of the optical disc being used. To sufficiently suppress such aberrations, the objective lens 210 is configured as follows.

Figure 22C:
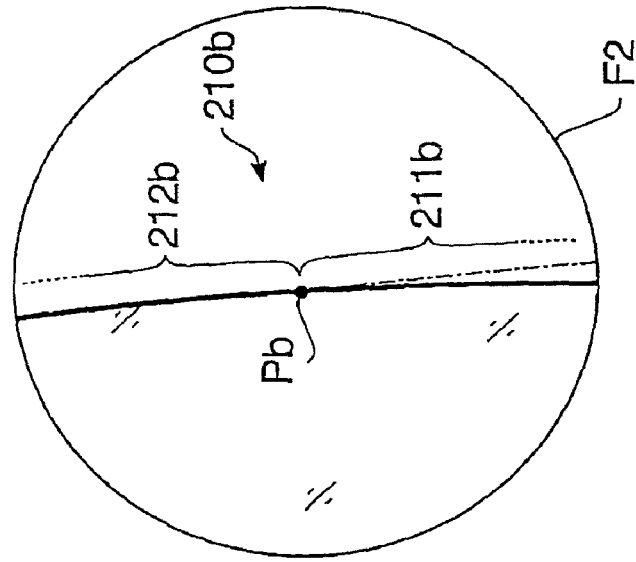
FIG. 22C is a cross section of a second surface of the objective lens shown in FIG. 22A.
Figure 22A:
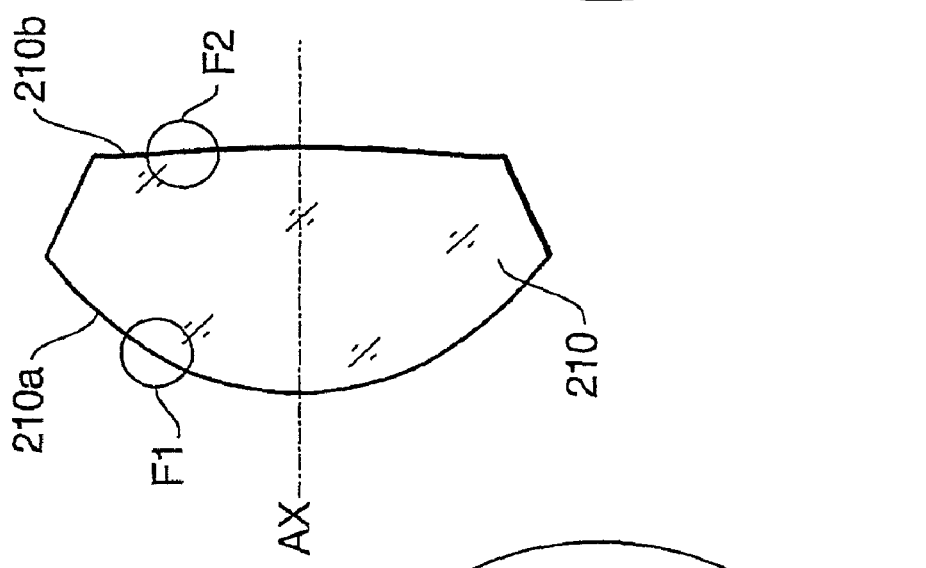
FIG. 22A is an enlarged view of the objective lens according to the second embodiment.
Figure 22B:
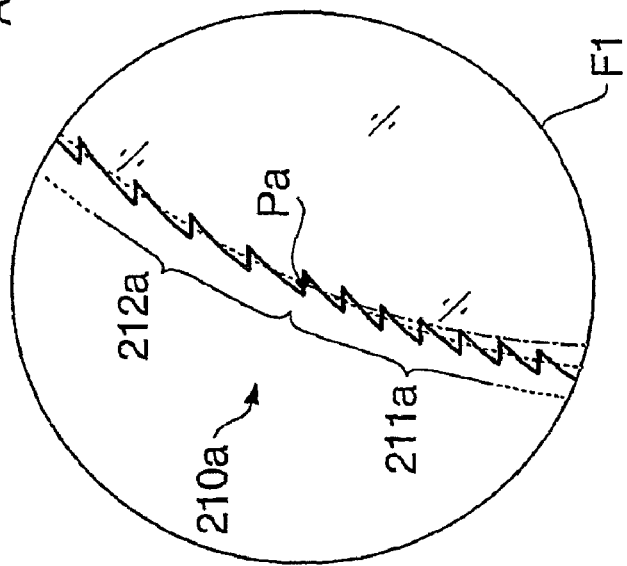
FIG. 22B is a cross section of a first surface of the objective lens shown in FIG. 22A.

FIG. 22A is an enlarged view of the objective lens 210. FIG. 22B is a cross section of the first surface 210a of the objective lens 210 illustrating a section F1 in FIG. 22A. FIG. 2C is a cross section of the second surface 210b of the objective lens 210 illustrating a section F2 in FIG. 22A.

As shown in FIG. 22B, the first surface 210a has an inner region 211a including the optical axis AX of the objective lens 210 and an outer region 212a surrounding the inner region 211a. The outer region 212a extends from a boundary between the inner region 211a and the outer region 212a to the outermost portion of the objective lens 210. The inner region 211a and the outer region 212a are configured to have different shapes.

Also, as shown in FIG. 22C, the second surface 210b has an inner region 211b including the optical axis AX and an outer region 212b surrounding the inner region 211b. The inner region 211b and the outer region 212b are configured to have different shapes. The outer region 212b on the second surface 210b is defined as a region through which the beam passed through the outer region 212a on the first surface 210a passes.

The inner regions 211a and 211b are regions for attaining the NA required to obtain a beam spot diameter suitable for recording data to and/or reproducing data from the optical disc 20B.

Since the recording density of the optical disc 20A is higher than that of the optical disc 20B, a beam spot having a diameter smaller than that for the optical disc 20B is required to record data to and/or to reproduce data from the optical disc 20A. In this embodiment, the outer regions 212a and 212b are used for attaining an NA larger than that for the optical disc 20B and thereby forming a smaller beam spot on the data recording layer of the optical disc 20A. Further, in this embodiment the outer regions 212a and 212b are configured not to converge the second laser beam.

Each of the first and second surfaces 210a and 210b of the objective lens 210 is divided into two regions (the inter and outer regions) having different shapes. Therefore, the degree of freedom of a lens design increases, which enables to configure the objective lens 210 so that the coma caused when the beam is incident on the objective lens 210 obliquely with respect to the optical axis AX is sufficiently suppressed for each of the optical discs 20A and 20B.

The detailed configuration of the objective lens 210 for correcting the coma caused when the beam is incident on the objective lens 210 obliquely with respect to the optical axis AX of the objective lens 210 is as follows.

The first surface 210a is configured such that, when the optical disc 20B (the second laser beam) is used, the amount of coma caused by the inner region 211a at a boundary position Pa between the inner region 211a and the outer region 212a is less than the amount of coma cased by the outer region 212a at the boundary position Pa. Similarly, the second surface 210b is configured such that, when the optical disc 20B (the second laser beam) is used, the amount of coma caused by the inner region 211b at a boundary position Pb between the inner region 211b and the outer region 212b is less than the amount of coma cased by the outer region 212b at the boundary position Pb.

In other words, the inner regions 211a and 211b correct the coma, caused when the optical disc 20B is used, more sufficiently than the coma caused when the optical disc 20A is used.

The outer regions 212a and 212b are configured to correct the coma caused when the optical disc 20A is used.

As described above, the objective lens 210 is configured to suppress the coma caused when the optical disc 20A is used as well as the coma caused when the optical disc 20B is used. Consequently, beam spots suitable for recording data to and/ or reproducing data from the optical discs 20A and 20B are formed on the data recording layers of the optical discs 20A and 20B, respectively.

The configuration of the objective lens 210 is described more specifically referring to FIG. 19, and hereafter the symbols in FIG. 19 are frequently used again to explain the configuration of the objective lens 210 in detail.

The second surface 210b of the objective lens 210 is configured such that at the boundary position $P_2$ the inclination $\theta_2$ of the outer region 212b is smaller than the inclination $\theta_2$ of the inner region 211b.

More specifically, the objective lens 210 is configured such that, at the boundary position Pb between the inner region 211b and the outer region 212b of the second surface 210b, the inclination $\theta_{2A}$ [degree] of the inner region 211b of the second surface 210b and the inclination $\theta_{2B}$ [degree] of the outer region 212b of the second surface 210b satisfy the following condition (4).

$$-2.5 < \theta_{2B} - \theta_{2A} < -0.05 \qquad (4)$$

Preferably, the first surface 210a of the objective lens 210 is configured such that the inclination $\theta_{1A}$ [degree] of the inner region 211a and the inclination $\theta_{1B}$ [degree] of the outer region 212a satisfy the condition (2).

$$-1.2 < \theta_{1B} - \theta_{1A} < 0.0 \qquad (2)$$

As shown in FIG. 22B, the first surface 210a has a diffracting structure. The diffracting structure formed within the inner region 211a and the diffracting structure formed within the outer region 212a are different from each other.

The diffracting structure formed within the inner region 211a is configured such that the first and second laser beams are suitably converged onto the data recording layers of the optical discs 20A and 20B, respectively. The diffracting structure formed within the outer region 212a is configured to suitably converge the first laser beam onto the data recording layer of the optical disc 20A and to diffuse the second laser beam incident thereon (i.e., the outer region 212a does not contribute to the formation of the beam spot for the optical disc 20B).

The diffracting structure formed within the outer region 212a is configured such that a wavefront of the first laser beam passed through the outer region 212a is continuously connected to a wavefront of the first laser beam passed through the inner region 211a.

With the above mentioned configuration, a portion of the second laser beam passed through the inner region 211a is suitably converged by the objective lens 210 onto the data recording layer of the optical disc 20B. Consequently, the beam spot suitable for recording data to and/or reproducing data from the optical disc 20B is formed on the data recording layer of the optical disc 20B. The first laser beam passed through the objective lens 210 forms the beam spot, suitable for recording data to and/or reproducing data from the optical disc 20A, on the data recording layer of the optical disc 20A.

In addition to the above mentioned configuration, the objective lens 210 according to the second embodiment has an additional feature described below.

Before explaining the additional feature of the objective lens 210, some possible problems which arise if a lens surface is formed by two regions having different shapes are discussed. When the lens surface is formed by the two regions, there may be a case where a step is formed at a boundary between the two regions. The possible problems which may arise when such a step is formed at the boundary on the second surface 210b of the objective lens 210 are that:

(1) the step may be damaged during the grinding process conducted by using a lens cleaner, and thereby dirt and debris may remain on the lens surface; or (2) corruption of a shape of the step formed on the lens surface may occur due to the faulty transferring in an injection molding process, and thereby loss of the light amount is caused by the corrupted shape of the step on the lens surface.

These problems become causes of reduction in quality of the objective lens.

Figure 20:
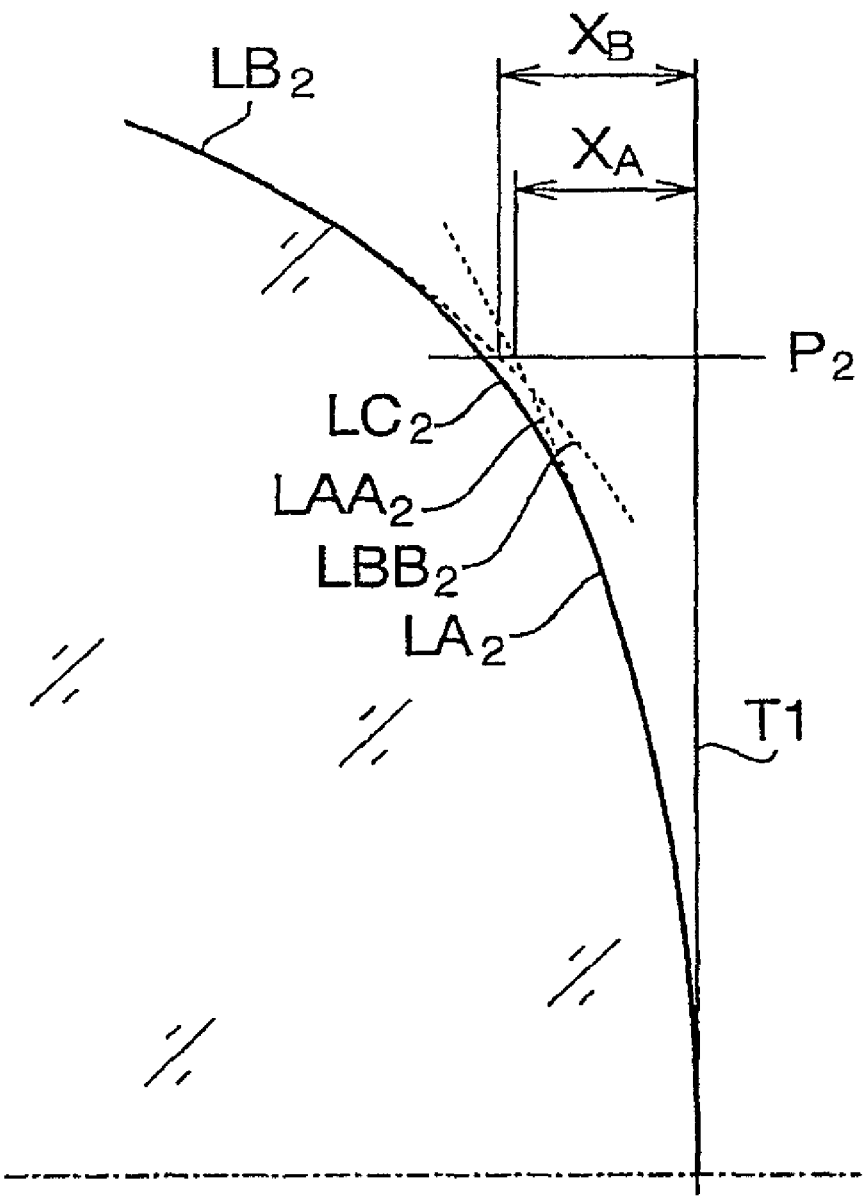
FIG. 20 is a cross section of a second surface of an objective lens according to a second embodiment.

To avoid the above mentioned problems, the second surface 210b of the objective lens 210 is configured as follows. FIG. 20 is a partial enlarged view of the objective lens 210 illustrating a cross section of the second surface 210b. In FIG. 20, to portions which are the same as those shown in FIG. 19, the same symbols are used, and explanations thereof will not be repeated.

In FIG. 20, symbols have the following meanings. "$LC_2$" represents a shape of a cross section at the boundary position $P_2$ when the boundary position is smoothed. The extension LAA may be represented as a surface defined by a surface shape of the inner region. Also, the extension LBB may be represented as a surface defined by a surface shape of the outer region. When the extensions LAA and LBB are represented as described above, "$X_A$" and "$X_B$" can be defined as follows.

"$X_A$" represents a distance, measured at the boundary position $P_2$, between the surface $LAA_2$ defined by the surface shape of the inner region $LA_2$ to a plane T1 tangential to the second surface 210b at the optical axis AX.

"$X_B$" represents a distance, measured at the boundary position $P_2$, between the surface $LBB_2$ defined by the surface shape of the outer region $LB_2$ to the plane T1 tangential to the second surface 210b at the optical axis AX.

More specifically, the surface defined by the surface shape of the inner region is a surface defined by the equation representing the inner region, and the surface defined by the surface shape of the outer region is a surface defined by the equation representing the outer region. The distance $X_A$ is determined based on a surface obtained by assigning a value of height h from the optical axis corresponding to the boundary position P to the equation of the inner region. The distance $X_B$ is determined based on a surface obtained by assigning a value of height h from the optical axis corresponding to the boundary position P to the equation of the outer region.

The second surface 210b is configured such that the distance $X_A$ at the boundary position $P_2$ and the distance $X_B$ at the boundary position $P_2$ satisfy the following condition (3).

$$-1.0 \times 10^{-3} < X_B - X_A < 1.0 \times 10^{-3} \quad (3)$$

By satisfying the condition (3), the height of the step formed on the second surface 210b between the inner region 211b and the outer region 212b is kept at low level, and thereby the above mentioned problems are effectively prevented.

Since the first surface 210a has the diffracting structure, even if a step is formed at the boundary between the inner region 211a and the outer region 212a, the step does not cause any problem.

Although, in the above mentioned second embodiment, the collimated beam is used for each of the optical discs 20A and 20B, the optical system may be configured such that a beam other than the collimated beam is incident on the objective lens 210 while the optical system 200 satisfying a condition where magnifications for both of the optical discs 20A and 20B are the same.

Hereafter, three concrete examples (third, fourth and fifth examples) according to the second embodiment of the invention will be described. In the following examples, the thicknesses of the cover layers of the optical discs 20A and 20B are 0.6 mm and 1.2 mm, respectively.

Third Example

The configuration of the optical system 200 according to a third example when the optical disc 20A is used is shown in FIG. 21A. The configuration of the optical system 200 according to the third example when the optical disc 20B is used is shown in FIG. 21B. Performance specifications of the objective lens 210 according to the third example are shown in Table 10.

TABLE 10

|  | First laser beam | Second laser beam |
|---|---|---|
| Design wavelength | 657 nm | 790 nm |
| Focal length f | 3.360 | 3.384 |
| NA | 0.600 | 0.465 |
| magnification | 0.000 | 0.000 |

Table 11 shows a numerical configuration of the optical system 200 according to the third example when the optical disc 20A is used. Table 12 shows a numerical configuration of the optical system 200 according to the third example when the optical disc 20B is used.

TABLE 11

| Surface Number | r | d | n (657 nm) | n (790 nm) |
|---|---|---|---|---|
| #0 |  | 2.36 |  |  |
| #1 | ∞ | 1.50 | 1.51383 | 1.51052 |
| #2 | ∞ | 17.00 |  |  |
| #3 | 126.470 | 1.77 | 1.54056 | 1.53653 |
| #4 | −12.670 | 10.00 |  |  |
| #5 (h ≦ 1.57) | 2.080 | 2.21 | 1.54056 | 1.53653 |
| #5 (1.57 ≦ h) | 2.085 |  |  |  |
| #6 (h ≦ 1.12) | −8.981 | 1.73 |  |  |
| #6 (1.12 ≦ h) | −9.071 |  |  |  |
| #7 | ∞ | 0.60 | 1.57982 | 1.57307 |
| #8 | ∞ | — |  |  |

TABLE 12

| Surface Number | r | d | n (657 nm) | n (790 nm) |
|---|---|---|---|---|
| #0 |  | 2.36 |  |  |
| #1 | ∞ | 1.50 | 1.51383 | 1.51052 |
| #2 | ∞ | 17.00 |  |  |
| #3 | 126.470 | 1.77 | 1.54056 | 1.53653 |
| #4 | −12.670 | 10.36 |  |  |
| #5 (h ≦ 1.57) | 2.080 | 2.21 | 1.54056 | 1.53653 |
| #5 (1.57 ≦ h) | 2.085 |  |  |  |
| #6 (h ≦ 1.12) | −8.981 | 1.37 |  |  |
| #6 (1.12 ≦ h) | −9.071 |  |  |  |
| #7 | ∞ | 1.20 | 1.57982 | 1.57307 |
| #8 | ∞ | — |  |  |

In Tables 11 and 12, "surface number" represents a surface number of each surface of optical components in the optical system. In Tables 12 and 13, a surface #0 represents the light source 30, surfaces #1 and #2 represent a light source side surface and an optical disc side surface of the branching element 40, respectively, surfaces #3 and #4 represent a light source side surface and an optical disc side surface of the coupling lens 50, respectively, and surfaces #5 and #6 represent the first surface 210a and the second surface 210b of the objective lens 210, respectively. In Table 11, surfaces #7 and #8 represent the cover layer and the data recording layer of the optical disc 20A, respectively. In Table 12, surfaces #7 and #8 represent the cover layer and the data recording layer of the optical disc 20B, respectively.

As shown in Tables 11 and 12, the first surface 210a of the objective lens 210 is divided into the inner region 211a and the outer region 212a by the boundary position Pa having the height h of 1.57 mm from the optical axis AX. That is, the inner region 211a and the outer region 212a are defined as follows.

inner region 211a: h≦1.57
outer region 212a: 1.57≦h

Similarly, the second surface 210b of the objective lens 210 is divided into the inner region 211b and the outer region 212b by the boundary position Pb having the height h of 1.12 mm from the optical axis AX. That is, the inner region 211b and the outer region 212b are defined as follows.

inner region 211b: h≦1.12
outer region 212b: 1.12≦h

The optical disc side surface (#4) of the coupling lens 50, the first surface 210a (#5) and the second surface 210b (#6) of the objective lens 210 are aspherical surfaces which are defined by the above mentioned equation. The inner region 211a and the outer region 212a of the first surface 210a are configured to be different aspherical shapes. Also, the inner region 211b and the outer region 212b of the second surface 210b are configured to be different aspherical shapes.

Table 13 shows the conical coefficients and aspherical coefficients of the optical disc side surface (#4) of the coupling lens 50, and the first surface 210a (#5) and the second surface 210b (#6) of the objective lens 210 according to the third example.

TABLE 13

| Surface | K | A4 | A6 |
|---|---|---|---|
| #4 | 0.0000 | 4.3890E−05 | 2.0480E−07 |
| #5 (h ≦ 1.57) | −0.5000 | −2.0210E−03 | −2.0980E−04 |
| #5 (1.57 ≦ h) | −0.5000 | −1.0040E−03 | −1.8960E−04 |
| #6 (h ≦ 1.12) | 0.0000 | 1.4010E−02 | −2.0380E−03 |
| #6 (1.12 ≦ h) | 0.0000 | 1.4730E−02 | −2.0270E−03 |

| | A8 | A10 | A12 |
|---|---|---|---|
| #4 | 8.2010E−10 | 0.0000E+00 | 0.0000E+00 |
| #5 (h ≦ 1.57) | 2.0380E−05 | 1.6870E−06 | 3.2222E−06 |
| #5 (1.57 ≦ h) | 1.8620E−05 | −8.4890E−06 | 4.2320E−07 |
| #6 (h ≦ 1.12) | 9.6450E−04 | −1.2650E−04 | −2.7244E−06 |
| #6 (1.12 ≦ h) | 3.0190E−06 | 6.2430E−05 | −7.8700E−06 |

The first surface 210a of the objective lens 210 has a diffracting structure expressed by the above mentioned optical path difference function Φ(h). In this example, the diffraction order m used for the recording and/or reproducing operation is 1. Table 14 shows values of the coefficients of the optical path difference function Φ(h) applied to the diffracting structure formed within the inner region 211a and the outer region 212a of the first surface 210a.

TABLE 14

| surface | P2 | P4 | P6 |
|---|---|---|---|
| #5 (h ≦ 1.57) | 0.0000E+00 | −1.6550E+00 | −1.3860E−01 |
| #5 (1.57 ≦ h) | −6.5260E−01 | −9.6980E−01 | −1.6230E−01 |

| | P8 | P10 | P12 |
|---|---|---|---|
| #5 (h ≦ 1.57) | 0.0000E+00 | 0.0000E+00 | 0.0000E+00 |
| #5 (1.57 ≦ h) | 0.0000E+00 | 0.0000E+00 | 0.0000E+00 |

With regard to the conditions (3) and (4), the objective lens 210 according to the third example take values of the distances $X_A$ and $X_B$, and the inclinations $\theta_{2A}$ and $\theta_{2B}$ indicated in Table 15. As shown in Table 15, the objective lens 210 according to the third example satisfies the conditions (3) and (4),

TABLE 15

| | Condition (3) | | Condition (4) |
|---|---|---|---|
| XA | −0.0502 | $\theta_{2A}$ | −3.15 |
| XB | −0.0501 | $\theta_{2B}$ | −3.52 |
| XB − XA | 0.0001 | $\theta_{2B} - \theta_{2A}$ | −0.37 |

Figure 23A:
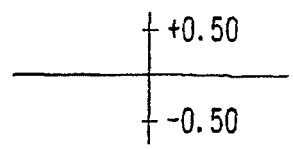
FIG. 23A is a graph illustrating a wavefront aberration of an on-axis ray caused in the optical system according to a third example when the first optical disc is used.
Figure 23B:
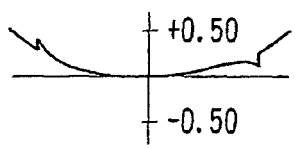
FIG. 23B is a graph illustrating a wavefront aberration of an off-axis ray caused in the optical system according to the third example when the first optical disc is used.
Figure 24A:
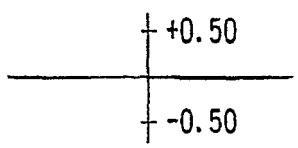
FIG. 24A is a graph illustrating a wavefront aberration of an on-axis ray caused in the optical system according to the third example when the second optical disc is used.
Figure 24B:
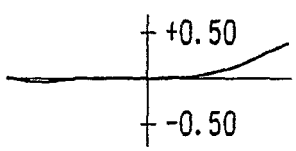
FIG. 24B is a graph illustrating a wavefront aberration of an off-axis ray caused in the optical system according to the third example when the second optical disc is used.

FIGS. 23A and 23B are graphs illustrating wavefront aberrations caused in the optical system 210 according to the third example when the optical disc 20A is used. FIGS. 24A and 24B are graphs illustrating wavefront aberrations caused in the optical system 210 according to the third example when the optical disc 20B is used. Each of FIGS. 23A and 24A shows the wavefront aberration regarding an on-axis ray, and each of FIGS. 23B and 24B shows the wavefront aberration regarding an off-axis ray (at an image height of 0.06 mm).

An objective lens according to a third comparative example is considered as follows for comparing with the objective lens 210 according the third example. The objective lens according to the third comparative example has substantially the same configuration as that of the objective lens 210 of the third example, but a second surface (an optical disc side surface) thereof is configured to be a single continuous surface. That is, the second surface of the objective lens according to the third comparative example is not divided into an inner region and an outer region.

Figure 25A:
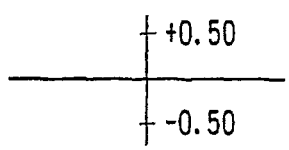
FIG. 25A is a graph illustrating a wavefront aberration of an on-axis ray caused in the optical system according to a third comparative example when the first optical disc is used.
Figure 25B:
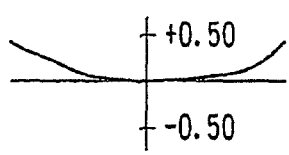
FIG. 25B is a graph illustrating a wavefront aberration of an off-axis ray caused in the optical system according to the third comparative example when the first optical disc is used.
Figure 26A:
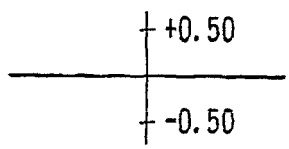
FIG. 26A is a graph illustrating a wavefront aberration of an on-axis ray caused in the optical system according to the third comparative example when the second optical disc is used.
Figure 26B:
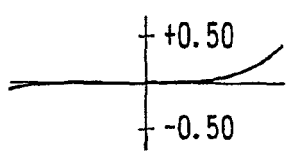
FIG. 26B is a graph illustrating a wavefront aberration of an off-axis ray caused in the optical system according to the third comparative example when the second optical disc is used.

FIGS. 25A and 25B are graphs illustrating wavefront aberrations caused in an optical system having the objective lens according to the third comparative example when the optical disc 20A is used. FIGS. 26A and 26B are graphs illustrating wavefront aberrations caused in the optical system according to the third comparative example when the optical disc 20B is used. Each of FIGS. 25A and 26A shows the wavefront aberration regarding an on-axis ray, and each of FIGS. 25B and 26B shows the wavefront aberration regarding an off-axis ray (at an image height of 0.06 mm).

Figure 27:
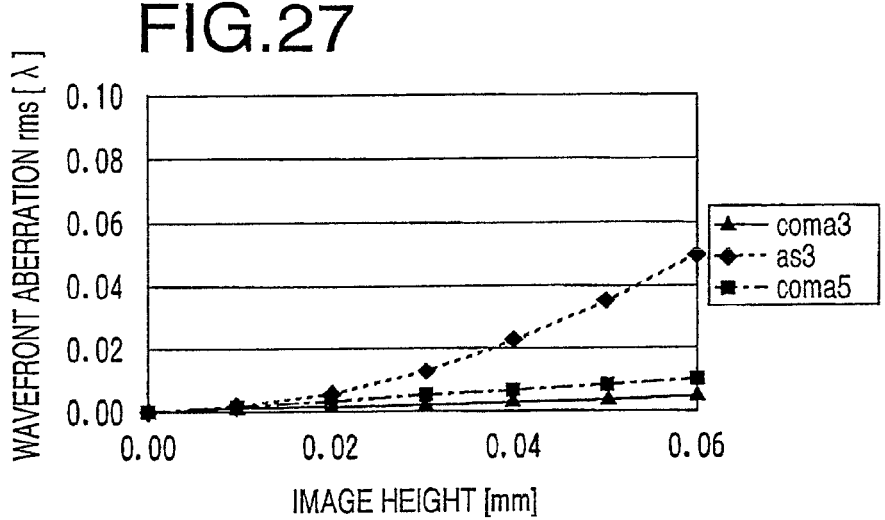
FIG. 27 is a graph illustrating a relationship between the wavefront aberration of the third example and the image height when the first optical disc is used.
Figure 28:
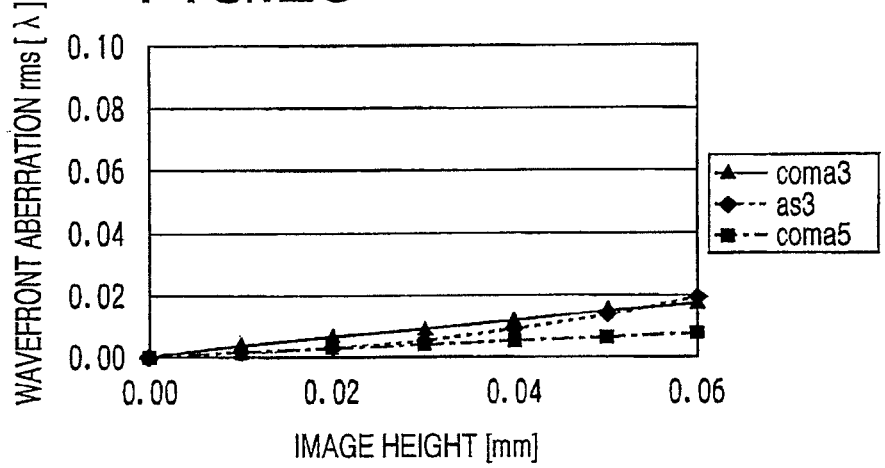
FIG. 28 is a graph illustrating a relationship between the wavefront aberration of the third example and the image height when the second optical disc is used.

FIGS. 27 and 28 respectively show the wavefront aberrations caused in the third example when the optical discs 20A and 20B are used. More specifically, FIG. 27 is a graph illustrating a relationship between the wavefront aberration rms[λ] and the image height [mm] when the optical disc 20A is used. FIG. 28 is a graph illustrating a relationship between the wavefront aberration rms[λ] and the image height [mm] when the optical disc 20B is used.

Figure 29:
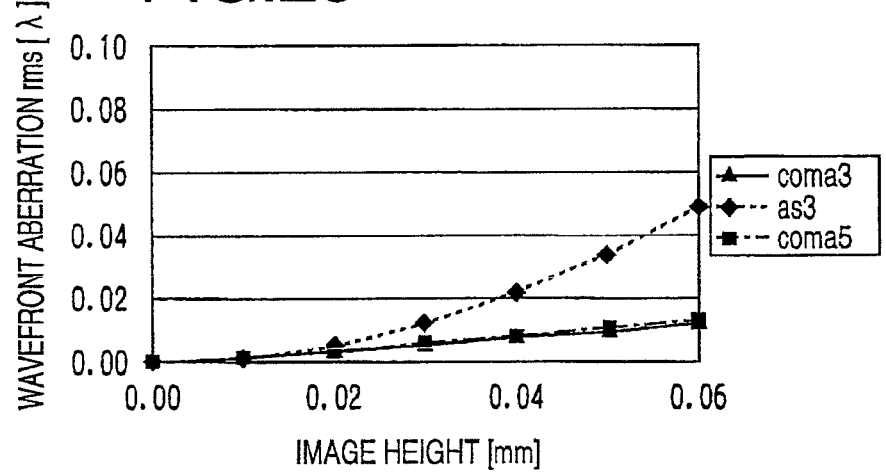
FIG. 29 is a graph illustrating a relationship between the wavefront aberration of the third comparative example and the image height when the first optical disc is used.
Figure 30:
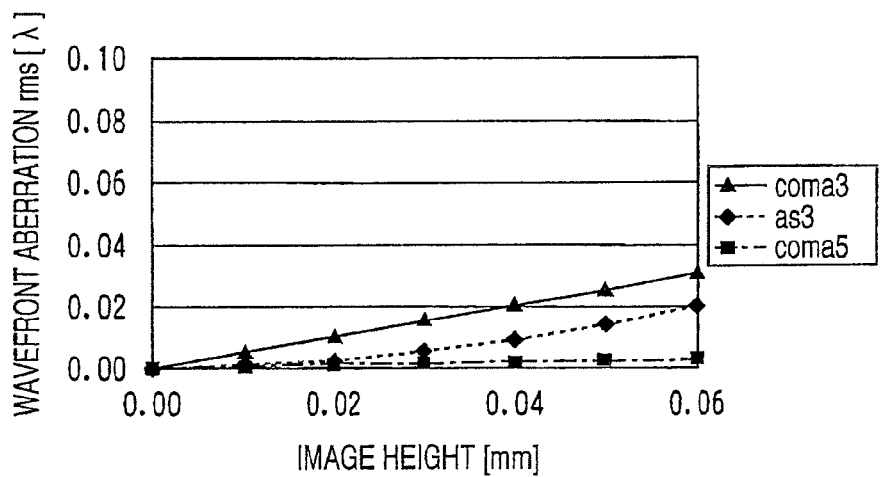
FIG. 30 is a graph illustrating a relationship between the wavefront aberration of the third comparative example and the image height when the second optical disc is used.

FIGS. 29 and 30 respectively show the wavefront aberrations caused, in the optical system including the objective lens according to the third comparative example, when the optical discs 20A and 20B are used. FIG. 29 is a graph illustrating a relationship between the wavefront aberration rms[λ] and the image height [mm] when the optical disc 20A is used in the optical system including the objective lens according to the third comparative example. FIG. 30 is a graph illustrating a relationship between the wavefront aberration rms[λ] and the image height [mm] when the optical disc 20B is used in the optical system including the objective lens according to the third comparative example.

The amount of the wavefront aberration caused when the optical disc 20A is used is analyzed as follows by making a comparison between FIG. 27 and FIG. 29. The coma of the third order caused in the case of the third example is reduced to a level substantially equal to the coma of the third order caused in the case of the third comparative example.

The amount of the wavefront aberration caused when the optical disc 20B is used is analyzed as follows by making a comparison between FIG. 28 and FIG. 30. The coma of the third order caused in the case of the third example is reduced more sufficiently than the coma of the third order caused in the case of the third comparative example. That is, the amount of the wavefront aberration caused in the case of the third example is reduced more sufficiently than the wavefront aberration caused in the case of the third comparative example.

Therefore, according to the third example, the coma of the third order is sufficiently suppressed for both of the optical discs 20A and 20B. Consequently, beam spots suitable for recording data to and/or reproducing data from the optical discs 20A and 20B can be formed on the data recording layers of the optical discs 20A and 20b, respectively.

An actual shape of the second surface 210b at the boundary position Pb is smoothed based on the numerical data shown in Tables 11, 12 and 13. Since the objective lens 210 according to the third example satisfies the conditions (3) and (4), the smoothed portion is very narrow. Therefore, the smoothed portion does not affect the formation of the suitable beam spots on the data recording layers of the optical discs 20A and 20B. That is, the suitable characteristics shown in FIGS. 23, 24, 27 and 28 are attained even if the actual shape of the second surface 210b at the boundary position Pb is smoothed.

Fourth Example

Figure 31A:
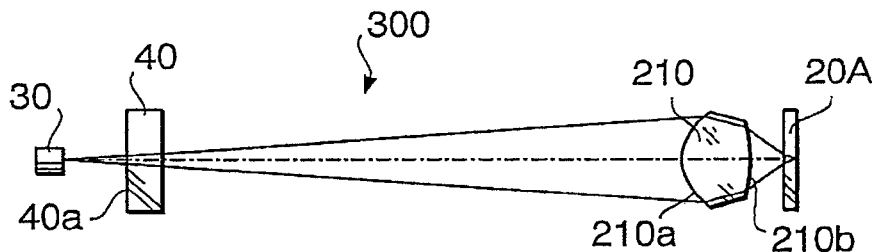
FIG. 31A shows a configuration of an optical system according to a fourth example of the second embodiment when the first optical disc is used.
Figure 31B:
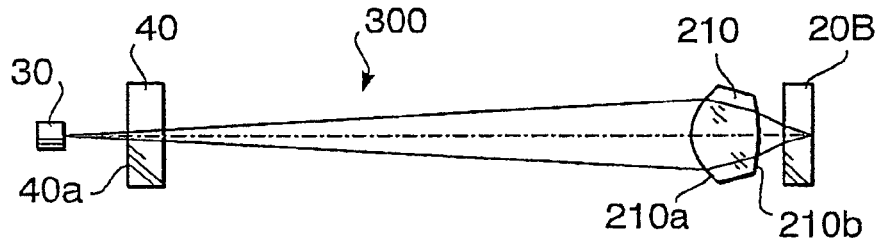
FIG. 31B shows a configuration of the optical system according to the fourth example of the second embodiment when the second optical disc is used.

FIG. 31A shows a configuration of an optical system 300 according to a fourth example when the optical disc 20A is used. FIG. 31B shows a configuration of the optical system 300 according to the fourth example when the optical disc 20B is used. As shown in FIGS. 31A and 31B, the optical system 300 is configured not to use the collimator lens, so that cost reduction can be attained. In FIGS. 31A and 31B, to elements which are the same as those shown in FIGS. 21A and 21B, same reference numbers are assigned.

In contrast to the third example, the first laser beam emitted by the light source 30 is incident on the objective lens 210 as a diverging beam, and the second laser beam emitted by the light source 30 is incident on the objective lens 210 as a diverging beam.

Performance specifications of the objective lens 210 according to the fourth example are shown in Table 16.

TABLE 16

|  | First laser beam | Second laser beam |
| --- | --- | --- |
| Design wavelength | 660 nm | 790 nm |
| Focal length f | 3.050 | 3.072 |
| NA | 0.600 | 0.470 |
| magnification | −0.125 | −0.124 |

Table 17 shows a numerical configuration of the optical system 300 according to the fourth example when the optical disc 20A is used. Table 18 shows a numerical configuration of the optical system 300 according to the fourth example when the optical disc 20B is used.

TABLE 17

| Surface Number | r | d | n (660 nm) | n (790 nm) |
| --- | --- | --- | --- | --- |
| #0 |  | 2.61 |  |  |
| #1 | ∞ | 1.50 | 1.51374 | 1.51052 |
| #2 | ∞ | 23.00 |  |  |
| #3 (h ≦ 1.61) | 2.091 | 3.05 | 1.54044 | 1.53653 |
| #3 (1.61 ≦ h) | 2.131 |  |  |  |
| #4 (h ≦ 1.05) | −3.731 | 1.50 |  |  |

TABLE 17-continued

| Surface Number | r | d | n (660 nm) | n (790 nm) |
| --- | --- | --- | --- | --- |
| #4 (1.05 ≦ h) | −3.768 |  |  |  |
| #5 | ∞ | 0.60 | 1.57961 | 1.57307 |
| #6 | ∞ | — |  |  |

TABLE 18

| Surface Number | r | d | n (657 nm) | n (790 nm) |
| --- | --- | --- | --- | --- |
| #0 |  | 2.61 |  |  |
| #1 | ∞ | 1.50 | 1.51374 | 1.51052 |
| #2 | ∞ | 23.36 |  |  |
| #3 (h ≦ 1.61) | 2.091 | 3.05 | 1.54044 | 1.53653 |
| #3 (1.61 ≦ h) | 2.131 |  |  |  |
| #4 (h ≦ 1.05) | −3.731 | 1.14 |  |  |
| #4 (1.05 ≦ h) | −3.768 |  |  |  |
| #5 | ∞ | 1.20 | 1.57961 | 1.57307 |
| #6 | ∞ | — |  |  |

In Tables 17 and 18, "surface number" represents a surface number of each surface of optical components in the optical system. In Tables 17 and 18, a surface #0 represents the light source 30, surfaces #1 and #2 represent a light source side surface and an optical disc side surface of the branching element 40, respectively, and surfaces #3 and #4 represent the first surface 210a and the second surface 210b of the objective lens 210, respectively. In Table 17, surfaces #5 and #6 represent the cover layer and the data recording layer of the optical disc 20A, respectively. In Table 18, surfaces #5 and #6 represent the cover layer and the data recording layer of the optical disc 20B, respectively.

As shown in Tables 17 and 18, the first surface 210a of the objective lens 210 is divided into the inner region 211a and the outer region 212a by the boundary position Pa having the height h of 1.61 mm from the optical axis AX. That is, the inner region 211a and the outer region 212a are defined as follows.

inner region 211a: h≦1.61
outer region 212a: 1.61≦h

Similarly, the second surface 210b of the objective lens 210 is divided into the inner region 211b and the outer region 212b by the boundary position Pb having the height h of 1.05 mm from the optical axis AX. That is, the inner region 211b and the outer region 212b are defined as follows.

inner region 211b: h≦1.05
outer region 212b: 1.05≦h

The first surface 210a (#3) and the second surface 210b (#4) of the objective lens 210 are aspherical surfaces which are defined by the above mentioned equation. The inner region 211a and the outer region 212a of the first surface 210a are configured to be different aspherical shapes. Also, the inner region 211b and the outer region 212b of the second surface 210b are configured to be different aspherical shapes.

Table 19 shows the conical coefficients and aspherical coefficients of the first surface 210a (#3) and the second surface 210b (#4) of the objective lens 210 according to the fourth example.

TABLE 19

| Surface | K | A4 | A6 |
| --- | --- | --- | --- |
| #3 (h ≦ 1.61) | −0.5000 | −4.9090E−03 | −3.1240E−04 |
| #3 (1.61 ≦ h) | −0.5000 | −1.5060E−03 | −6.4440E−04 |

TABLE 19-continued

| | | | |
|---|---|---|---|
| #4 (h ≦ 1.05) | 0.0000 | 3.7715E-02 | -1.1230E-02 |
| #4 (1.05 ≦ h) | 0.0000 | 3.6040E-02 | -9.7060E-03 |

| | A8 | A10 | A12 |
|---|---|---|---|
| #3 (h ≦ 1.61) | -4.7570E-05 | 5.2730E-06 | -1.6280E-06 |
| #3 (1.61 ≦ h) | -3.9280E-05 | 4.9180E-07 | -1.9093E-06 |
| #4 (h ≦ 1.05) | 3.5410E-03 | -8.7030E-04 | 1.0400E-04 |
| #4 (1.05 ≦ h) | 2.0640E-03 | -3.3203E-04 | 2.7906E-05 |

The first surface 210a of the objective lens 210 has a diffracting structure expressed by the above mentioned optical path difference function Φ(h). In this example, the diffraction order m used for the recording and/or reproducing operation is 1.

Table 20 shows values of the coefficients of the optical path difference function Φ(h) applied to the diffracting structure formed within the inner region 211a and the outer region 212a of the first surface 210a.

TABLE 20

| | P2 | P4 | P6 |
|---|---|---|---|
| #3 (h ≦ 1.61) | 1.4000E+00 | -1.8919E+00 | -5.8250E-02 |
| #3 (1.61 ≦ h) | -2.6204E+00 | 7.3080E-01 | -3.9820E-01 |

| | P8 | P10 | P12 |
|---|---|---|---|
| #3 (h ≦ 1.61) | 0.0000E+00 | 0.0000E+00 | 0.0000E+00 |
| #3 (1.61(h) | 0.0000E+00 | 0.0000E+00 | 0.0000E+00 |

With regard to the conditions (3) and (4), the objective lens 210 according to the fourth example take values of the distances XA and XB, and the inclinations $\theta_{2A}$ and $\theta_{2B}$ indicated in Table 21. As shown in Table 21, the objective lens 210 according to the fourth example satisfies the conditions (3) and (4).

TABLE 21

| Condition (3) | | Condition (4) | |
|---|---|---|---|
| $X_A$ | -0.1162 | $\theta_{2A}$ | -9.99 |
| $X_B$ | -0.1161 | $\theta_{2B}$ | -10.15 |
| $X_B - X_A$ | 0.0001 | $\theta_{2B} - \theta_{2A}$ | -0.16 |

Figure 32A:
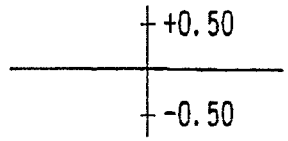
FIG. 32A is a graph illustrating a wavefront aberration of an on-axis ray caused in the optical system according to the fourth example when the first optical disc is used.
Figure 32B:
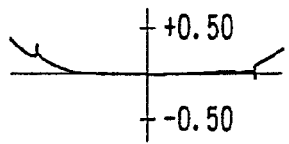
FIG. 32B is a graph illustrating a wavefront aberration of an off-axis ray caused in the optical system according to the fourth example when the first optical disc is used.
Figure 33A:
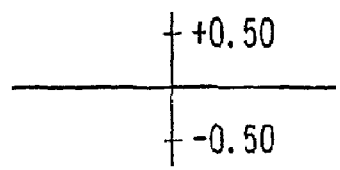
FIG. 33A is a graph illustrating a wavefront aberration of an on-axis ray caused in the optical system according to the fourth example when the second optical disc is used.
Figure 33B:
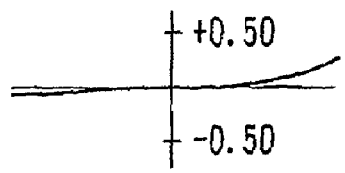
FIG. 33B is a graph illustrating a wavefront aberration of an off-axis ray caused in the optical system according to the fourth example when the second optical disc is used.

FIGS. 32A and 32B are graphs illustrating wavefront aberrations caused in the optical system 300 according to the fourth example when the optical disc 20A is used. FIGS. 33A and 33B are graphs illustrating wavefront aberrations caused in the optical system 300 according to the fourth example when the optical disc 20B is used. Each of FIGS. 32A and 33A shows the wavefront aberration regarding an on-axis ray, and each of FIGS. 32B and 33B shows the wavefront aberration regarding an off-axis ray (at an image height of 0.06 mm).

An objective lens according to a fourth comparative example is considered as follows for comparing with the objective lens 210 according the fourth example. The objective lens according to the fourth comparative example has substantially the same configuration as that of the objective lens 210 of the fourth example, but a second surface (an optical disc side surface) thereof is configured to be a single continuous surface. That is, the second surface of the objective lens according to the fourth comparative example is not divided into an inner region and an outer region.

Figure 34A:
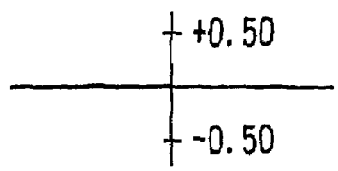
FIG. 34A is a graph illustrating a wavefront aberration of an on-axis ray caused in the optical system according to a fourth comparative example when the first optical disc is used.
Figure 34B:
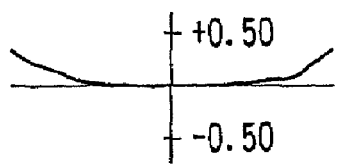
FIG. 34B is a graph illustrating a wavefront aberration of an off-axis ray caused in the optical system according to the fourth comparative example when the first optical disc is used.
Figure 35A:
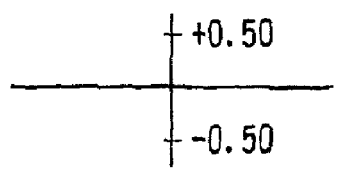
FIG. 35A is a graph illustrating a wavefront aberration of an on-axis ray caused in the optical system according to the fourth comparative example when the second optical disc is used.
Figure 35B:
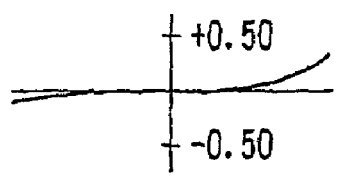
FIG. 35B is a graph illustrating a wavefront aberration of an off-axis ray caused in the optical system according to the fourth comparative example when the second optical disc is used.

FIGS. 34A and 34B are graphs illustrating wavefront aberrations caused in an optical system having the objective lens according to the fourth comparative example when the optical disc 20A is used. FIGS. 35A and 35B are graphs illustrating wavefront aberrations caused in the optical system according to the fourth comparative example when the optical disc 20B is used. Each of FIGS. 34A and 35A shows the wavefront aberration regarding an on-axis ray, and each of FIGS. 34B and 35B shows the wavefront aberration regarding an off-axis ray (at an image height of 0.06 mm).

Figure 36:
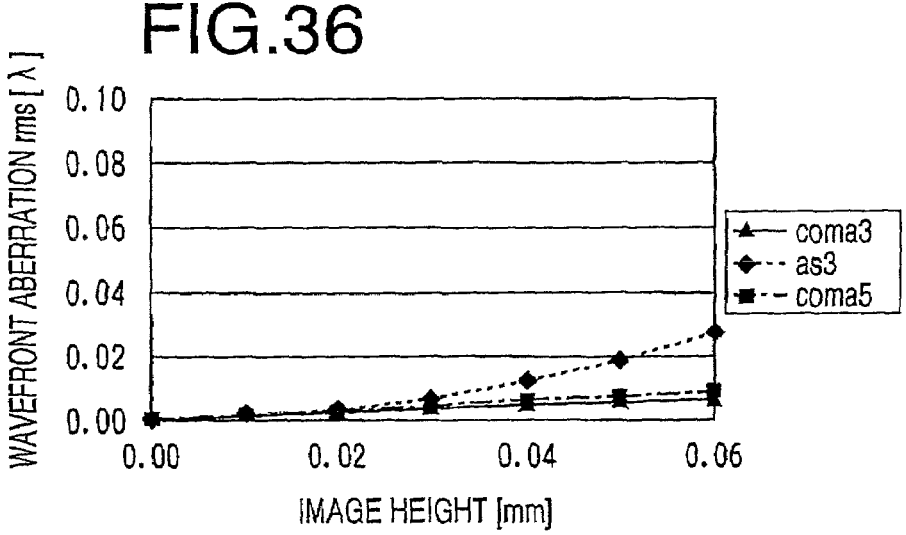
FIG. 36 is a graph illustrating a relationship between the wavefront aberration of the fourth example and the image height when the first optical disc is used.
Figure 37:
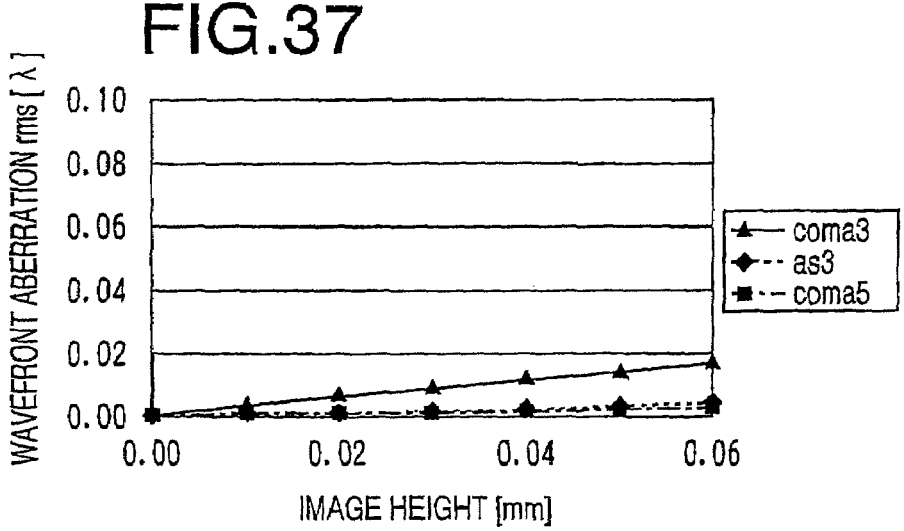
FIG. 37 is a graph illustrating a relationship between the wavefront aberration of the fourth example and the image height when the second optical disc is used.

FIGS. 36 and 37 respectively show the wavefront aberrations caused in the fourth example when the optical discs 20A and 20B are used. More specifically, FIG. 36 is a graph illustrating a relationship between the wavefront aberration rms[λ] and the image height [mm] when the optical disc 20A is used. FIG. 37 is a graph illustrating a relationship between the wavefront aberration rms[λ] and the image height [mm] when the optical disc 20B is used.

Figure 38:
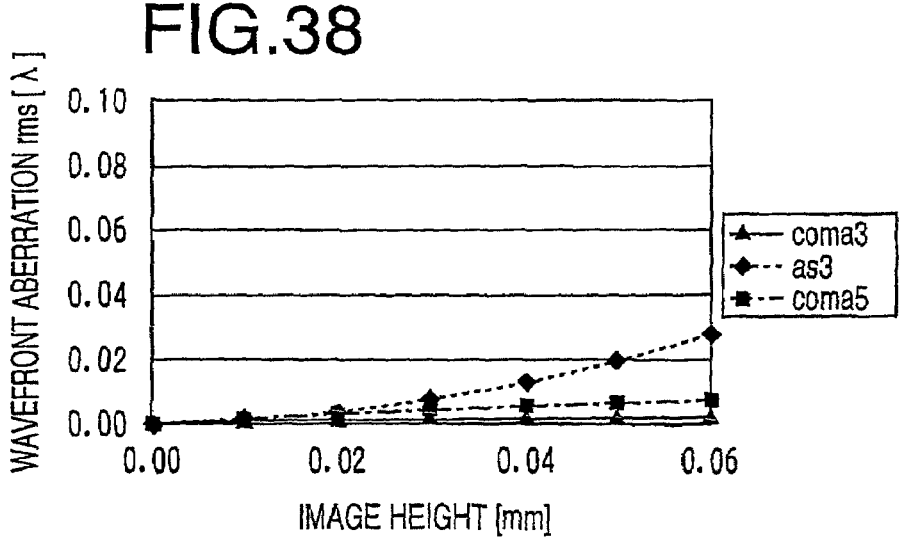
FIG. 38 is a graph illustrating a relationship between the wavefront aberration of the fourth comparative example and the image height when the first optical disc is used.
Figure 39:
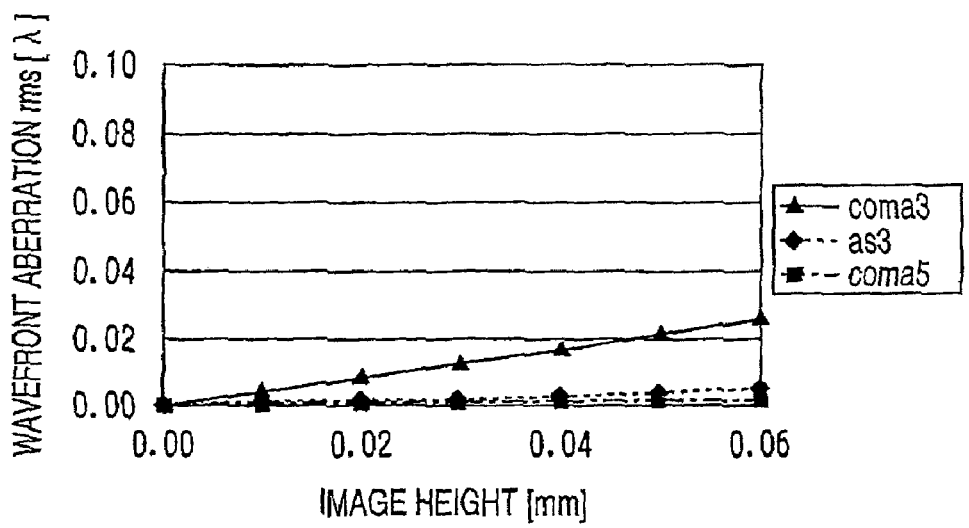
FIG. 39 is a graph illustrating a relationship between the wavefront aberration of the fourth comparative example and the image height when the second optical disc is used.

FIGS. 38 and 39 respectively show the wavefront aberrations caused, in the optical system including the objective lens according to the fourth comparative example, when the optical discs 20A and 20B are used. FIG. 38 is a graph illustrating a relationship between the wavefront aberration rms[λ] and the image height [mm] when the optical disc 20A is used in the optical system including the objective lens according to the fourth comparative example. FIG. 39 is a graph illustrating a relationship between the wavefront aberration rms[λ] and the image height [mm] when the optical disc 20B is used in the optical system including the objective lens according to the fourth comparative example.

The amount of the wavefront aberration caused when the optical disc 20A is used is analyzed as follows by making a comparison between FIG. 36 and FIG. 38. Although the coma of the third order caused in the case of the fourth example is slightly larger than the coma of the third order caused in the case of the fourth comparative example, the amount of the coma of the third order caused in the fourth example is sufficiently low. Therefore, the formation of the beam spot suitable for the optical disc 20A is not affected.

The amount of the wavefront aberration caused when the optical disc 20B is used is analyzed as follows by making a comparison between FIG. 37 and FIG. 39. The coma of the third order caused in the case of the fourth example is reduced more sufficiently than the coma of the third order caused in the case of the fourth comparative example.

Therefore, according to the fourth example, the coma of the third order is sufficiently suppressed for both of the optical discs 20A and disc 20B. Consequently, beam spots suitable for recording data to and/or reproducing data from the optical discs 20A and 20B can be formed on the data recording layers of the optical discs 20A and 20b, respectively.

An actual shape of the second surface 210b at the boundary position Pb is smoothed based on the numerical data shown in Tables 17, 18 and 19. Since the objective lens 210 according to the fourth example satisfies the conditions (3) and (4), the smoothed portion is very narrow. Therefore, the smoothed portion does not affect the formation of the suitable beam spots on the data recording layers of the optical discs 20A and 20B. That is, the suitable characteristics shown in FIGS. 32, 33, 36 and 37 are attained even if the actual shape of the second surface 210b at the boundary position Pb is smoothed.

Fifth Example

The configuration of the optical system 200 according to a fifth example when the optical disc 20A is used is shown in FIG. 21A. The configuration of the optical system 200 according to the fifth example when the optical disc 20B is used is shown in FIG. 21B. Performance specifications of the objective lens 210 according to the fifth example are the same as those shown in Table 10.

Table 22 shows a numerical configuration of the optical system 200 according to the fifth example when the optical disc 20A is used. Table 23 shows a numerical configuration of the optical system 200 according to the fifth example when the optical disc 20B is used. The meanings of the surface numbers in Tables 22 and 23 are the same as those of the third example.

TABLE 22

| Surface Number | r | d | n (657 nm) | n (790 nm) |
|---|---|---|---|---|
| #0 | | 2.36 | | |
| #1 | ∞ | 1.50 | 1.51383 | 1.51052 |
| #2 | ∞ | 17.00 | | |
| #3 | 126.470 | 1.77 | 1.54056 | 1.53653 |
| #4 | −12.670 | 10.00 | | |
| #5 (h ≦ 1.57) | 2.078 | 2.21 | 1.54056 | 1.53653 |
| #5 (1.57 ≦ h) | 2.071 | | | |
| #6 (h(1.12) | −9.039 | 1.73 | | |
| #6 (1.12(h) | −9.400 | | | |
| #7 | ∞ | 0.60 | 1.57982 | 1.57307 |
| #8 | ∞ | — | | |

TABLE 23

| Surface Number | r | d | n (657 nm) | n (790 nm) |
|---|---|---|---|---|
| #0 | | 2.36 | | |
| #1 | ∞ | 1.50 | 1.51383 | 1.51052 |
| #2 | ∞ | 17.00 | | |
| #3 | 126.470 | 1.77 | 1.54056 | 1.53653 |
| #4 | −12.670 | 10.36 | | |
| #5 (h ≦ 1.57) | 2.078 | 2.21 | 1.54056 | 1.53653 |
| #5 (1.57 ≦ h) | 2.071 | | | |
| #6 (h ≦ 1.12) | −9.039 | 1.37 | | |
| #6 (1.12 ≦ h) | −9.400 | | | |
| #7 | ∞ | 1.20 | 1.57982 | 1.57307 |
| #8 | ∞ | — | | |

As shown in Tables 22 and 23, the first surface 210a of the objective lens 210 is divided into the inner region 211a and the outer region 212a by the boundary position Pa having the height h of 1.57 mm from the optical axis AX. That is, the inner region 211a and the outer region 212a are defined as follows.

inner region 211a: h≦1.57
outer region 212a: 1.57≦h

Similarly, the second surface 210b of the objective lens 210 is divided into the inner region 211b and the outer region 212b by the boundary position Pb having the height h of 1.12 mm from the optical axis AX. That is, the inner region 211b and the outer region 212b are defined as follows.

inner region 11b: h≦1.12
outer region 12b: 1.12≦h

The optical disc side surface (#4) of the coupling lens 50, the first surface 210a (#5) and the second surface 210b (#6) of the objective lens 210 are aspherical surfaces which are defined by the above mentioned expression. The inner region 211a and the outer region 212a of the first surface 210a are configured to be different aspherical shapes. Also, the inner region 211b and the outer region 212b of the second surface 210b are configured to be different aspherical shapes.

Table 24 shows the conical coefficients and aspherical coefficients of the optical disc side surface (#4) of the coupling lens 50, and the first surface 210a (#5) and the second surface 210b (#6) of the objective lens 210 according to the fifth example.

TABLE 24

| Surface | K | A4 | A6 |
|---|---|---|---|
| #4 | 0.0000 | 4.3890E−05 | 2.0480E−07 |
| #5 (h ≦ 1.57) | −0.5000 | −1.7960E−03 | −1.6270E−04 |
| #5 (1.57 ≦ h) | −0.5000 | −1.2630E−03 | −2.4790E−04 |
| #6 (h ≦ 1.12) | 0.0000 | 1.5440E−02 | −2.2930E−03 |
| #6 (1.12 ≦ h) | 0.0000 | 1.4660E−02 | −2.1860E−03 |

| | A8 | A10 | A12 |
|---|---|---|---|
| #4 | 8.2010E−10 | 0.0000E+00 | 0.0000E+00 |
| #5 (h ≦ 1.57) | 3.7600E−05 | −6.8980E−06 | 7.0714E−06 |
| #5 (1.57 ≦ h) | 7.0160E−05 | −2.4510E−05 | 3.9525E−06 |
| #6 (h ≦ 1.12) | 8.7220E−04 | 1.4000E−04 | −5.8565E−05 |
| #6 (1.12 ≦ h) | 2.6980E−04 | 4.1340E−05 | −1.0813E−05 |

The first surface 210a of the objective lens 210 has a diffracting structure expressed by the above mentioned optical path difference function Φ(h). Table 25 shows values of the coefficients of the optical path difference function Φ (h) applied to the diffracting structure formed within the inner region 211a and the outer region 212a of the first surface 210a.

TABLE 25

| | P2 | P4 | P6 |
|---|---|---|---|
| #5 (h ≦ 1.57) | 0.0000E+00 | −1.6640E+00 | −1.3170E−01 |
| #5 (1.57 ≦ h) | −1.6200E−02 | −1.2310E+00 | −1.4260E−01 |

| | P8 | P10 | P12 |
|---|---|---|---|
| #5 (h ≦ 1.57) | 0.0000E+00 | 0.0000E+00 | 0.0000E+00 |
| #5 (1.57 ≦ h) | 0.0000E+00 | 0.0000E+00 | 0.0000E+00 |

With regard to the conditions (3), (4) and (5), the objective lens 210 according to the fifth example take values of the distances $X_A$ and $X_B$, the inclinations $\theta_{2A}$ and $\theta_{2B}$ and the inclinations $\theta_{1A}$ and $\theta_{1B}$ indicated in Table 26. As shown in Table 26, the objective lens 210 according to the fifth example satisfies the conditions (3), (4) and (5).

TABLE 26

| | Condition (3) | | Condition (4) | | Condition (5) |
|---|---|---|---|---|---|
| $X_A$ | −0.0473 | $\theta_{2A}$ | −2.63 | $\theta_{1A}$ | 41.08 |
| $X_B$ | −0.0472 | $\theta_{2B}$ | −3.17 | $\theta_{1B}$ | 41.02 |
| $X_B - X_A$ | 0.0001 | $\theta_{2B} - \theta_{2A}$ | −0.54 | $\theta_{1B} - \theta_{1A}$ | −0.06 |

Figure 40A:
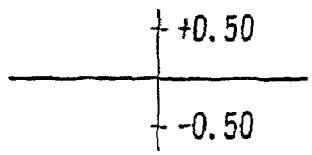
FIG. 40A is a graph illustrating a wavefront aberration of an on-axis ray caused in the optical system according to a fifth example when the first optical disc is used.
Figure 40B:
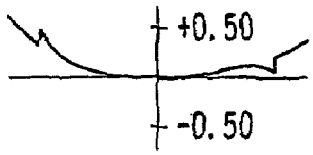
FIG. 40B is a graph illustrating a wavefront aberration of an off-axis ray caused in the optical system according to the fifth example when the first optical disc is used.
Figure 41A:
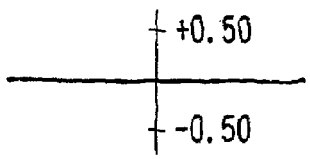
FIG. 41A is a graph illustrating a wavefront aberration of an on-axis ray caused in the optical system according to the fifth example when the second optical disc is used.
Figure 41B:
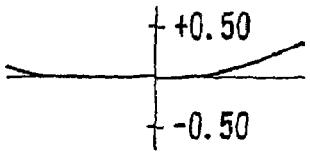
FIG. 41B is a graph illustrating a wavefront aberration of an off-axis ray caused in the optical system according to the fifth example when the second optical disc is used.

FIGS. 40A and 40B are graphs illustrating wavefront aberrations caused in the optical system 210 according to the fifth example when the optical disc 20A is used. FIGS. 41A and 41B are graphs illustrating wavefront aberrations caused in the optical system 210 according to the fifth example when the optical disc 20B is used. Each of FIGS. 40A and 41A shows the wavefront aberration regarding an on-axis ray, and each of FIGS. 40B and 41B shows the wavefront aberration regarding an off-axis ray (at an image height of 0.06 mm).

Figure 42:
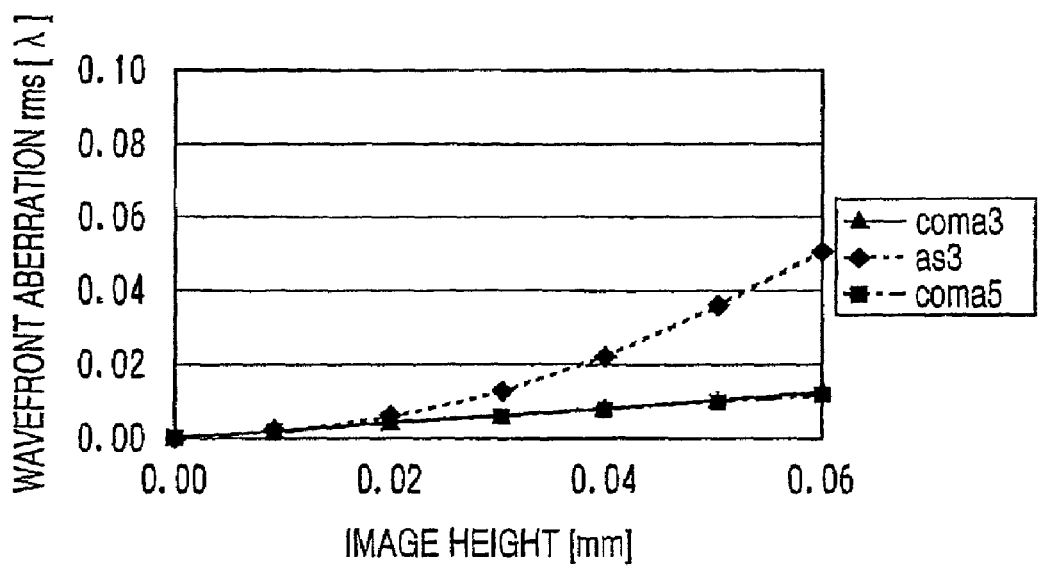
FIG. 42 is a graph illustrating a relationship between the wavefront aberration of the fifth example and the image height when the first optical disc is used.
Figure 43:
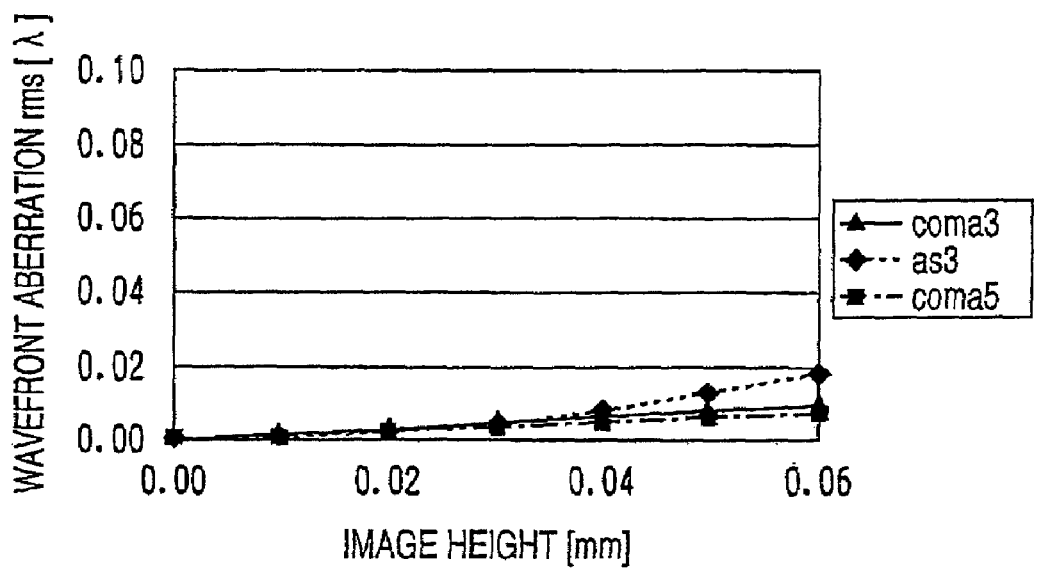
FIG. 43 is a graph illustrating a relationship between the wavefront aberration of the fifth example and the image height when the second optical disc is used.

FIGS. 42 and 43 respectively show the wavefront aberrations caused in the fifth example when the optical discs 20A and 20B are used. More specifically, FIG. 42 is a graph illustrating a relationship between the wavefront aberration rms[λ] and the image height [mm] when the optical disc 20A is used. FIG. 43 is a graph illustrating a relationship between the wavefront aberration rms[λ] and the image height [mm] when the optical disc 20B is used.

To analyze the amount the wavefront aberration caused in the fifth example, the third comparative example is used here again. The amount of the wavefront aberration caused when the optical disc 20A is used is analyzed as follows by making a comparison between FIG. 42 and FIG. 29. The coma of the third order caused in the case of the fifth example is reduced to a level substantially equal to the coma of the third order caused in the case of the third comparative example.

The amount of the wavefront aberration caused when the optical disc 20B is used is analyzed as follows by making a comparison between FIG. 43 and FIG. 30. The coma of the third order caused in the case of the fifth example is reduced more sufficiently than the coma of the third order caused in the case of the third comparative example.

Therefore, according to the fifth example, the coma of the third order is sufficiently suppressed for both of the optical discs 20A and 20B. Consequently, beam spots suitable for recording data to and/or reproducing data from the optical discs 20A and 20B can be formed on the data recording layers of the optical discs 20A and 20b, respectively.

An actual shape of the second surface 210b at the boundary position Pb is smoothed based on the numerical data shown in Tables 22, 23 and 24. Since the objective lens 210 according to the fifth example satisfies the conditions (3) and (4), the smoothed portion is very narrow. Therefore, the smoothed portion does not affect the formation of the suitable beam spots on the data recording layers of the optical discs 20A and 20B. That is, the suitable characteristics shown in FIGS. 40, 41, 42 and 43 are attained even if the actual shape of the second surface 210b at the boundary position Pb is smoothed.

For example, a size of an area (i.e., the smoothed portion $LC_2$ in FIG. 20) for continuously connecting the inner region to the outer region may be less than or equal to 2% of a sum of areas of the inner and outer regions of the second surface 210b of the objective lens 210. When the smoothed portion has such a size, the reduction of the amount of light by the objective lens can be prevented.

Although the present invention has been described in considerable detail with reference to certain preferred embodiments thereof, other embodiments are possible.

In the above mentioned first embodiment, the objective lens is configured such that the inner regions correct the coma, caused when the optical disc 20B is used, more sufficiently than the coma caused when the optical disc 20A is used. However, the inner regions of the objective lens may be configured such that at least the coma, caused when the optical disc 20B is used, is reduced. For example, the inner regions of the objective lens may be configured such that the coma is sufficiently suppressed for an optical disc whose cover layer has an intermediate thickness between the optical disc 20A and the optical disc 20B. Such an objective lens can also attain substantially the same advantage as that of the above mentioned embodiment.

In FIG. 20, a size of the smoothed position $LC_2$ increases as a difference between the distance $X_B$ and the distance $X_A$ increases. For this reason, it is preferable that the condition (3) is satisfied when the boundary position $LC_2$ is smoothed.

The objective lens may be formed by injection molding using a mold configured such that a portion corresponding to the boundary position of at least one of the first and second surfaces of the objective lens is processed to be a continuous surface by using an R-bite if design shapes of the inner region and the outer region of at least one of the first and second surfaces are discontinuously connected to each other at the boundary position or are not completely continuously connected to each other at the boundary position. The R-bite is one of plurality of types of cutting tools, and has a rounded tip portion.

The optical disc drive employing the objective lens according to the embodiment may be one of a device specialized for recording data to optical discs, a device specialized for reproducing data from optical discs and a device capable of performing recording operation and reproducing operation.

The present disclosure relates to the subject matters contained in Japanese Patent Applications No. P2003-281814, filed on Jul. 29, 2003, and No. P2003-340755, filed on Sep. 30, 2003, which are expressly incorporated herein by reference in their entireties.

What is claimed is:

1. An objective lens comprising a front surface and a rear surface, each of the front and rear surfaces including a plurality of regions having different shapes, the rear surface being configured such that, at each of boundary positions between adjacent ones of the plurality of regions, the adjacent ones of the plurality of regions are continuously connected to each other, each of the shapes of the plurality of regions of the rear surface being defined by a different equation,
wherein the front surface has a diffraction structure, and the rear surface is a refractive surface without a diffraction structure.

2. The objective lens according to claim 1,
wherein the plurality of regions of the rear surface include an inner region and an outer region outside the inner region, and
wherein a size of an area for continuously connecting the inner region to the outer region on the rear surface is less than or equal to 2% of a sum of areas of the inner and outer regions of the rear surface.

3. The objective lens according to claim 1, each of the different shapes comprising a different aspherical surface, the different equations comprising an equation defining the aspherical surfaces and having different aspherical coefficients.

4. The objective lens according to claim 1, wherein the plurality of regions comprises first and second regions, an extension of the surface of each of the first and second regions into the other of the first and second regions being configured such that a laser beam having a predetermined wavelength and incident at a predetermined oblique angle with respect to the optical axis causes less coma in being incident onto each of the surfaces of the first and second regions than in being incident onto the extension of the surfaces of the other of the first and second regions.

5. The objective lens according to claim 1, wherein the plurality of regions comprises first and second regions continuously connected to each other at a boundary region, the first region being closer to the optical axis than the second region, and the inclination angle, in the boundary region, of the second region is smaller than the inclination angle of the first region.

6. An optical system comprising an objective lens having a front surface and a rear surface, each of the front and rear surfaces including a plurality of regions having different shapes, the rear surface being configured such that, at each of boundary positions between adjacent ones of the plurality of regions, the adjacent ones of the plurality of regions are continuously connected to each other, each of the shapes of the plurality of regions of the rear surface being defined by a different equation,
wherein the front surface has a diffraction structure, and the rear surface is a refractive surface without a diffraction structure.

7. The optical system according to claim 6,
wherein the plurality of regions of the rear surface of the objective lens include an inner region and an outer region outside the inner region, and
wherein a size of an area for continuously connecting the inner region to the outer region on the rear surface is less than or equal to 2% of a sum of areas of the inner and outer regions of the rear surface.

8. The optical system according to claim 6, wherein the plurality of regions comprises first and second regions, an extension of the surface of each of the first and second regions into the other of the first and second regions being configured such that a laser beam having a predetermined wavelength and incident at a predetermined oblique angle with respect to the optical axis causes less coma in being incident onto each of the surfaces of the first and second regions than in being incident onto the extension of the surfaces of the other of the first and second regions.

9. The optical system according to claim 6, wherein the plurality of regions comprises first and second regions continuously connected to each other at a boundary region, the first region being closer to the optical axis than the second region, and the inclination angle, in the boundary region, of the second region is smaller than the inclination angle of the first region.

10. An objective lens comprising a front surface and a rear surface, each of the front and rear surfaces including a plurality of regions having different shapes,
wherein each of the shapes of the plurality of regions of the rear surface being defined by a different equation,
wherein the objective lens is formed by injection molding using a mold configured such that portions corresponding to boundary positions of adjacent ones of the plurality of regions on the rear surface are processed to be continuous surfaces by using an R-bite,
wherein the front surface has a diffraction structure, and the rear surface is a refractive surface without a diffraction structure.

11. The optical system according to claim 6, each of the different shapes comprising a different aspherical surface, the different equations comprising an equation defining the aspherical surfaces and having different aspherical coefficients.

12. The objective lens according to claim 10,
wherein each of the different shapes comprising a different aspherical surface, the different equations comprising an equation defining the aspherical surfaces and having different aspherical coefficients.

13. The objective lens according to claim 10, wherein the plurality of regions comprises first and second regions, an extension of the surface of each of the first and second regions into the other of the first and second regions being configured such that a laser beam having a predetermined wavelength and incident at a predetermined oblique angle with respect to the optical axis causes less coma in being incident onto each of the surfaces of the first and second regions than in being incident onto the extension of the surfaces of the other of the first and second regions.

14. The objective lens according to claim 10, wherein the plurality of regions comprises first and second regions continuously connected to each other at a boundary region, the first region being closer to the optical axis than the second region, and the inclination angle, in the boundary region, of the second region is smaller than the inclination angle of the first region.

15. The objective lens according to claim 10, wherein the plurality of regions of the rear surface of the objective lens include an inner region and an outer region radially outside the inner region, and a size of an area that continuously connects the inner region and the outer region on the rear surface is less than or equal to 2% of a sum of the areas of the inner and outer regions of the rear surface.

16. An optical system comprising an objective lens having a front surface and a rear surface, each of the front and rear surfaces including a plurality of regions having different shapes,
wherein each of the shapes of plurality of regions of the rear surface being defined by a different equation,
wherein the objective lens is formed by injection molding using a mold configured such that portions corresponding to boundary positions of adjacent ones of the plurality of regions on the rear surface are processed to be continuous surfaces, respectively, by using an R-bite,
wherein the front surface has a diffraction structure, and the rear surface is a refractive surface without a diffraction structure.

17. The optical system according to claim 16,
wherein each of the different shapes comprising a different aspherical surface, the different equations comprising an equation defining the aspherical surfaces and having different aspherical coefficients.

18. The optical system according to claim 16, wherein the plurality of regions comprises first and second regions, an extension of the surface of each of the first and second regions into the other of the first and second regions being configured such that a laser beam having a predetermined wavelength and incident at a predetermined oblique angle with respect to the optical axis causes less coma in being incident onto each of the surfaces of the first and second regions than in being incident onto the extension of the surfaces of the other of the first and second regions.

19. The optical system according to claim 16, wherein the plurality of regions comprises first and second regions continuously connected to each other at a boundary region, the first region being closer to the optical axis than the second region, and the inclination angle, in the boundary region, of the second region is smaller than the inclination angle of the first region.

20. The optical system according to claim 16, wherein the plurality of regions of the rear surface of the objective lens include an inner region and an outer region radially outside of the inner region, and a size of an area that continuously connects the inner region to the outer region of the rear surface is less than or equal to 2% of a sum of the areas of the inner and outer regions of the rear surface.

* * * * *